United States Patent [19]

Asbeck

[11] 4,452,290
[45] Jun. 5, 1984

[54] CHAIN FOR THE TIRES OF HEAVY DUTY AUTOMOTIVE VEHICLES

[76] Inventor: Heinz Asbeck, Markusstr. 38, D-4600 Dortmund-Hohensyburg, Fed. Rep. of Germany

[21] Appl. No.: 459,126

[22] Filed: Jan. 19, 1983

[30] Foreign Application Priority Data

Jan. 23, 1982 [EP] European Pat. Off. ........ 82100459.5

[51] Int. Cl.³ .............................................. B60C 27/20
[52] U.S. Cl. ......................................... 152/244; 59/86
[58] Field of Search ................... 152/223, 224, 225 R, 152/231, 243, 244, 245, 167, 170, 171, 180, 185, 172, 233, 239, 240; 59/84–93

[56] References Cited

U.S. PATENT DOCUMENTS 1,187,173 6/1916 Putnam .............................. 152/172
3,696,853 10/1972 Sobota et al. ........................ 152/231
3,802,477 4/1974 Sobota et al. ........................ 152/231

FOREIGN PATENT DOCUMENTS 1880605 10/1963 Fed. Rep. of Germany ...... 152/244
1817170 7/1970 Fed. Rep. of Germany ...... 152/244

Primary Examiner—Edward C. Kimlin
Assistant Examiner—F. K. Wine
Attorney, Agent, or Firm—Peter K. Kontler

[57] ABSTRACT

The endless band-like portion of a chain for the tires of heavy duty automotive vehicles is assembled of substantially square main links and U-shaped shackles. Each link has a base plate which engages the tread of the tire and an outer plate which engages the ground and is spaced apart from and defines with the base plate a compartment containing projections which extend from the base plate and/or outer plate and serve to engage and retain detent members on the legs of the shackles. Each link has at least one yoke disposed in a plane extending at right angles to the respective plates and engaging the web of a shackle whose legs are anchored in the compartment of a neighboring link. At least one leg of each shackle has a spur which cooperates with the web of an adjacent shackle to prevent the extraction of legs from the compartment wherein the legs are anchored as a result of engagement of their detent members with the projections of the respective link.

64 Claims, 42 Drawing Figures

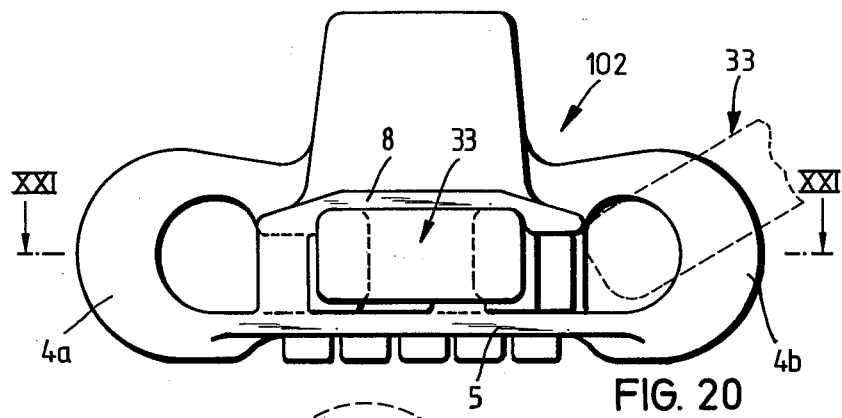
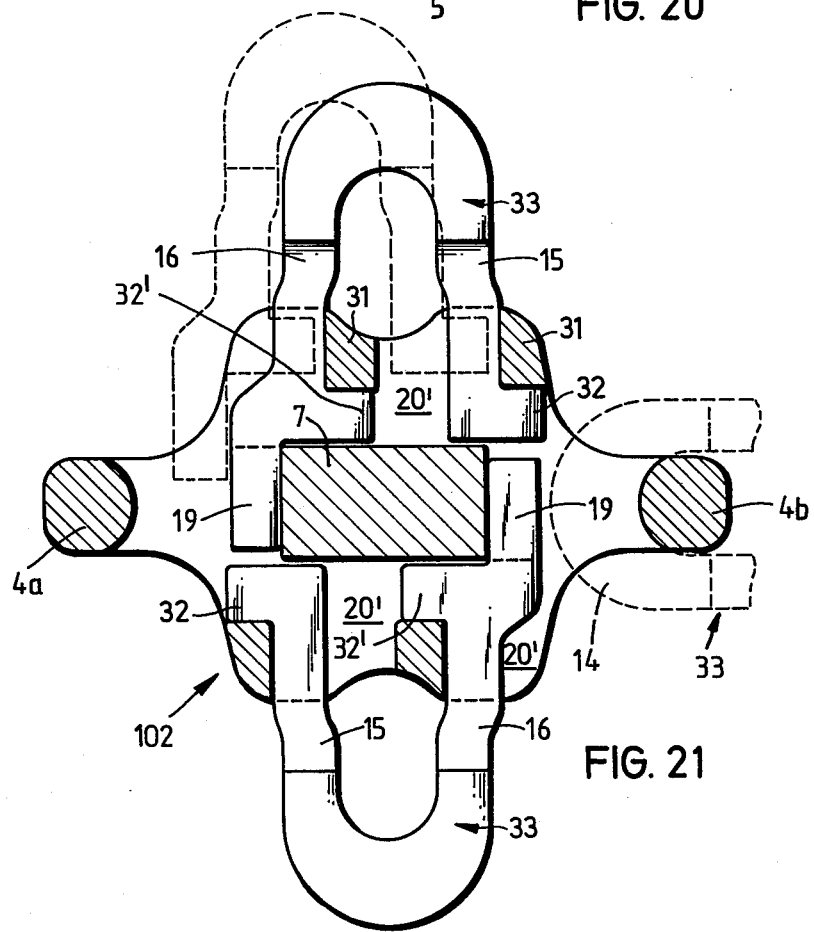
FIG. 20
FIG. 21

CHAIN FOR THE TIRES OF HEAVY DUTY AUTOMOTIVE VEHICLES

BACKGROUND OF THE INVENTION

The present invention relates to improvements in nets, chains or tracks for use on the tires of automotive vehicles. More particularly, the invention relates to improvements in nets, chains or tracks (hereinafter called chains) which can be used on tires consisting of a rubber or another elastomeric material, especially on large tires of the type employed on the wheels of heavy-duty earth moving or analogous vehicles.

It is already known to equip the tires of heavy-duty vehicles with chains which enhance the antiskid properties of the wheels and shield the tires from excessive and uneven wear and/or other damage as a result of repeated contact with pieces of rock, gravel, stone or the like. The chains of presently known design normally comprise a network of links each of which has at least one coupling portion extending from the general plane of the respective link and serving to facilitate attachment of the link to a neighboring link. In many instances, the links are or resemble plates having a regular outline and abutting against the external surface of the tire. The aforementioned coupling portions are often disposed in planes which are normal to the planes of the plates of the respective links. Vehicles (normally high-speed vehicles) which employ such chains on their tires include dump trucks, scrapers, levelers (i.e., vehicles which are used for smoothing horizontal or sloping terrain), front loaders as well as a wide variety of additional earth moving or analogous heavy-duty vehicles which are designed to travel at speeds of up to and even in excess of 40 mph. The tires on the wheels of such vehicles are often huge and highly expensive so that the provision of chains which shield the tires and prolong their useful life is not only desirable and warranted but also necessary in the interest of economy.

Canadian Pat. No. 182,055 discloses a chain which is to be used on the tires of the aforediscussed types of vehicles and includes substantially plate-like links which abut against the external surface of the tire and are coupled to each other. The coupling means include integral portions of the links which extend outwardly from the general planes of the respective plates. The planes of such integral coupling portions are normally disposed at an angle of approximately 90° to the planes of the corresponding plates. The means for coupling the plates of neighboring links to each other further comprises annular coupling elements which resemble the elements of a conventional rudimentary chain and serve to join the coupling portions of neighboring links, preferably in such a way that the sides of neighboring links are parallel to each other. The annular coupling elements are parallel to each other and extend substantially at right angles to the sides of the links. The assembly can be completed without resort to a welding operation. This is highly desirable because the absence of welding operations reduces the initial cost of the chain. The reduction in cost is surprisingly pronounced in view of the ever-increasing cost of welding.

The patented chain exhibits a number of serious drawbacks. Thus, such chain must be assembled of a relatively large number of different components which contributes to the initial cost of the ultimate product. This is due to the fact that the aforementioned annular coupling elements must be secured to pin-shaped coupling portions by suitable locking devices including rings which are fastened to the links. The assembly of plate-like links with pin-shaped coupling portions, annular coupling elements and means for locking the coupling elements to the respective pin-shaped coupling portions is subject to very pronounced wear and to pronounced stresses, e.g., during travel of the vehicle on rocky terrain where the parts of the chains strike against sharp pieces of rock, gravel or the like. Therefore, the useful life of such chains is relatively short as a result of extensive wear and/or breakage of their components.

It is further known to assemble a chain for use on the tires of wheels of heavy-duty vehicles by resort to welded components. German Utility Model No. 18 80 605 discloses an antiskid chain which is assembled of flat and oval vertical components and ring-shaped welded horizontal components. The welding operation cannot be avoided in view of the specific design of the just mentioned components. In addition to the drawbacks resulting from the need for welding (namely, high initial cost, secondary heat-treatment after welding, and others), the longitudinal cross-sectional area of the vertical components of such chains is relatively small and each such component has a relatively small surface which contacts the ground and is thus subject to wear when the vehicle is in use. This reduces the useful life of the chain because a relatively small amount of wear upon the vertical components renders the chain useless for its intended purpose. An inversion of such chains (inside out) is not possible because the vertical components undergo one-sided wear as a result of repeated tilting which cannot be avoided in view of unstable mounting of such vertical components. In other words, the vertical components are coupled to the horizontal components in such a way that their tilting in response to engagement with the ground is unavoidable with attendant unpredictable (one-sided) wear which prevents the further use of such chains in inverted position.

German Auslegeschrift No. 18 17 170 discloses a chain which employs relatively narrow stilt-like vertical components having small tire-contacting surfaces so that the mounting of these vertical components inveriably entails at least some tilting. The chain which is disclosed in this German publication need not employ any welded components in that endless band-like portion thereof which surrounds the tread of the tire; however, the components which connect the band-like portion to the lateral chains for the tire invariably include welded parts. Moreover, and as already mentioned above, the stilt-like vertical components of the band-like portion of the chain are unstable, i.e., the horizontal components cannot prevent tilting of vertical components with the result that the vertical components are subjected to unpredictable and normally one-side wear. Still further, tilting of the vertical components promotes wear so that the useful life of such chains is very short and the chains cannot be used in inverted position. Each and every revolution of the wheel entails pronounced tilting of the vertical components. The pronouncedness of such tilting movements is attributable not only to the configuration and manner of mounting of the vertical components but also to the fact that the horizontal components of the chain are unstable, i.e., the horizontal components cannot offer sufficient resistance to tilting of the vertical components. It has been found that the uneven and unpredictable wear upon the vertical components is so pronounced that a chain of such construction must be discarded well ahead of the time when the same chain would require replacement were the wear upon the vertical components uniform, i.e., if the wear would be ideal so that the entire portion of each vertical component which is provided for the express purpose of wearing away would be used up prior to the need for replacement of the chain. As a rule, one-sided wear upon the vertical components of the chain results in the formation of sharp edges which prevent an inversion of the chain after a certain period of use.

Still another drawback of the just discussed conventional chain is that its dimensions increase (not only in the circumferential direction but also transversely of the tread of the tire) with progressing wear. This necessitates frequent tensioning of the chain. However, the extent to which the chain can be tensioned is rather limited and, furthermore, repeated tensioning results in a shift of the endless band-like portion of the chain with reference to the tread (i.e., with reference to the ideal position of the band-like portion relative to the tire) so that the inclination of the vertical components increases from a relatively small acute angle toward a position in which the vertical components are disposed at or close to a right angle with reference to the direction of travel. This, too, contributes to more pronounced stressing of, and hence to a more pronounced wear upon, the vertical components. Moreover, the chain which is disclosed in the aforementioned German Auslegeschrift exhibits the drawback that it must employ a large number of locking bolts along both marginal portions of the endless band-like part of the chain.

A drawback which is common to all heretofore known chains is that the lateral chains which shield the inner and outer sides of the tires must include welded components whose shielding or protecting action is unsatisfactory and whose cost is extremely high.

OBJECTS AND SUMMARY OF THE INVENTION

An object of the invention is to provide a chain which is constructed and assembled in such a way that it need not employ any welded parts and which is capable of adequately protecting the tires of heavy-duty vehicles on all kinds of terrain and for extended periods of time.

Another object of the invention is to provide a chain which comprises a minimal number of different parts and wherein such parts can be assembled in a time-saving operation.

A further object of the invention is to provide a chain whose components are held against undesirable movements relative to the tire with a surprising degree of reliability and wherein the wear upon the components is much more predictable than in heretofore known chains.

An additional object of the invention is to provide a chain whose components can stand long periods of intensive wear without affecting the integrity of the chain and wherein such components can be manufactured at a low cost in accordance with any one of a wide variety of mass-producing techniques.

Another object of the invention is to provide novel and improved components for use in a chain of the above outlined character.

A further object of the invention is to provide a chain wherein the components can be assembled into any one of a wide variety of patterns so as to best protect the tire and/or promote the ability of the vehicle to advance on difficult terrain.

Another object of the invention is to provide a novel and improved method of assembling the components of the chain into an endless band-like body which can be applied around the tread of the tire in a heavy-duty automotive vehicle, such as an earth moving vehicle, a vehicle which is used in forests for the transport of logs or the like and/or for a wide variety of analogous or other purposes.

A further object of the invention is to provide the components of the improved chain with novel antiskid protuberances which can be used to enhance the mobility of the vehicle on the ground or to prevent skidding of the chain with reference to the tire.

Still another object of the invention is to provide a chain which is readily invertible so that its useful life can be prolonged by turning its band-like portion inside out when the ground-contacting side has undergone a maximum permissible amount of wear.

An additional object of the invention is to provide a chain whose integrity can be restored in a simple and time-saving manner by replacing one or more broken and/or damaged components A further object of the invention is to provide a chain which can be used on the existing tires of heavy-duty vehicles as a superior and more versatile substitute for heretofore known chains.

An additional object of the invention is to provide a chain wherein the neighboring components exhibit a high degree of mobility relative to one another so as to readily conform to the outline of the tire when the vehicle is driven on uneven terrain and wherein the positions of the components which surround the tread of the tire can be readily adjusted to compensate for wear.

Another object of the invention is to provide the above outlined chain with novel and improved auxiliary or intermediate components which allow for convenient and reliable attachment of its band-like portion to the chain or chains serving to protect the inner and/or outer side of the tire.

A further object of the invention is to provide a chain which is surprisingly thin in spite of its pronounced resistance to wear and/or breakage and which is capable of protecting large, small, wide, narrow, treaded or treadless tires with a heretofore unmatched degree of reliability.

Another object of the invention is to provide a chain which can be rapidly converted from a chain exhibiting highly satisfactory antiskid properties on one type of terrain to a chain which exhibits highly satisfactory antiskid and/or other desirable properties on other types of terrain.

An additional object of the invention is to provide a chain whose components can be assembled into a practically unlimited number of eye-pleasing and/or utilitarian patterns.

The invention is embodied in a protecting and antiskid chain for use on the tires of automotive vehicles, especially on the tires of high-speed, heavy-duty earth moving or like vehicles. The chain comprises a pair of main links each of which includes a tire-contacting base plate and a ground-contacting outer plate which latter is spaced apart from and is substantially parallel to the respective base plate. The plates of each link define a preferably flat compartment, and each link further includes at least one yoke which is rigid with the plates and is disposed in a plane extending at least substantially at right angles to the planes of the respective plates. The yokes are located outside of the confines of the respective plates and each link further includes a plurality of projections which are provided on at least one of the plates and are disposed in the compartment. The chain further comprises a first shackle (preferably a substantially U-shaped component which resembling staple) which articulately connects the links to one another and includes a web which is interfitted with the yoke of one of the links. The shackle further comprises two legs having detent members which extend into the compartment of the other link and engage with selected projections in such compartment to anchor the legs to the other link. The legs of the shackle are disposed in a plane which is at least substantially normal to the plane of the yoke forming part of the other link. The shackle has a symmetry axis which preferably extends midway between its legs and is substantially normal to the symmetry axis of the yoke of the other link. The symmetry axis of the yoke is located in the plane of such yoke and is preferably (but not necessarily) disposed in a plane midway between the planes of the base plate and the outer plate of the respective link.

Each link can be provided with two coplanar yokes extending from the opposite sides of the respective link and each connecting the base plate and the outer plate of the respective link.

The projections of each link can be distributed in such a way that they form a first group at one side and a second group at the other side of the plane of the respective yoke or yokes. Such groups of projections define guide channels for the detent members on the legs of the shackle. The projections are preferably (but not necessarily) provided on each plate of each main link, and such projections can define first guide channels adjacent to the base plate and second guide channels adjacent to the outer plate of the respective link. The projections of each link can further comprise a preferably centrally located post which is disposed in the plane of the respective yoke or yokes and bounds portions of the guide channels in the respective compartment. Such post can be provided with extensions which are disposed between the first and second groups of projections in the respective compartment. The post assists the yoke or yokes in rigidly connecting the base plate and the outer plate of the respective link to one another. The post is preferably normal or substantially normal to the planes of the respective plates.

The two groups of projections in the compartment of a link can be mirror symmetrical to one another with reference to the plane of the respective yoke or yokes. Each such group can further define at least one passage through which the detent members of the legs of a shackle can be introduced into the respective guide channels to thereupon move in such guide channels to their final positions in which the legs of the shackle are properly anchored in the respective link. In accordance with one embodiment, the detent members of each leg are disposed in planes which are normal to the common plane of the legs, and such detent members are preferably received in the guide channels of the links with a certain amount of play. Each group of projections can comprise a pair of projections on one plate of the respective link or a pair of projections on each plate of the respective link. At least some of the projections (in addition to or in lieu of the aforementioned post) can be designed to connect the plates of the respective link to one another, and such projections can define with the respective plates passages for introduction of detent members into the corresponding channels. In such chain, the detent members and the legs of a shackle can be disposed in a common plane to allow for a reduction of the thickness of the links.

At least one leg of the shackle is preferably provided with a spur which is received in the compartment of the other link adjacent to the yoke of such other link. The spur is adjacent to the web of a second shackle which is interlinked with the yoke of the link and the web of the second shackle is preferably immediately adjacent to the spur of a properly anchored first shackle so that the first shackle cannot be detached from the respective link except upon disengagement of the web of the second shackle from the yoke of the other link. The detent members of the shackles and the projections of the links are preferably configurated and dimensioned in such a way that they prevent extraction of the legs of a shackle from the compartment of a link even after extensive wear upon the web of the second shackle and/or upon the yoke of the link. The guide channels for the detent members are preferably parallel to the plane of the respective yoke or yokes.

The links and the first shackle preferably form part of an endless band-like portion of the chain which surrounds the tread of a tire, and such band-like portion has two marginal portions extending along the respective sides of the tread. The chain can further comprise additional shackles with eyelets engaging the yokes of those links which are adjacent to the marginal portions to connect such links with intermediate links or other parts serving to tension the band-like portion so that the base plates of the links are held in abutment with the external surface of the tread. The eyelets of such additional shackles are located in planes which are normal to the planes of plates of links into which the legs of the additional shackles extend.

Each of the plates can have a substantially square outline with two pairs of substantially parallel sides, and the outer plate of each link preferably registers (i.e., accurately overlaps) with the respective base plate. If each such link has two coplanar yokes, the yokes extend from one pair of parallel sides of the respective plates and their common plane is preferably parallel to the other pair of parallel sides. The yokes can be disposed midway between the other pair of parallel sides of plates forming part of the just discussed links.

The arcuate portions of the yokes preferably have first radii of curvature and the web of the first shackle has an arcuate portion with a larger second radius of curvature so that the web and the yoke of the one link are in a mere point contact (or close to a mere point contact) with one another when the exposed sides of the base plates abut against the tread of a tire. The second radius of curvature can exceed the first radii of curvature by approximately 20%. The yoke-engaging surface of the web is preferably a convex surface with a radius of curvature exceeding the first radii of curvature. The web of the shackle and/or the yokes of the links can include enlarged portions which are provided for the express purpose of wearing away as a result of engagement with and movement relative to one another.

At least one of the links can be provided with one or more protuberances extending from the outer side of its base plate and/or from the outer side of its outer plate. Each such protuberance can have a substantially V-shaped outline, a substantially polygonal (e.g., square or rectangular) outline, a cylindrical or circular outline or a substantially star-shaped outline (e.g., a stellate outline with four prongs). Each plate of each link can be provided with a single protuberance, or at least one plate of each link can have a plurality of protuberances. At least some of the protuberances on a plate or link can consist of an elastomeric material, of a highly wear-resistant synthetic plastic material or of a metallic material. At least some of the protuberances (e.g., the aforementioned elastic protuberances) can constitute substantially cylindrical pads of strips (e.g., in the form of beads at the outer sides of the base plates). The plates of the links can constitute forgings and the protuberances can be integral with the respective plates.

Alternatively each of the links can comprise means for separably securing the protuberances to the respective plates. Such separable protuberances can constitute drop forgings made of steel or an equivalent metallic material. However, it is equally possible to make the separable protuberances of a highly wear-resistant synthetic plastic material. The links which carry separable or detachable protuberances can be provided with preferably centrally located bores for complementary stubs of the respective detachable protuberances. The studs can be formed with diametral slots for reception of elastic fillers. Portions of such stubs can extend beyond the outer side of one of the plates in the respective links, and the securing means can further comprise split rings which are received in external grooves machined into such portions of the stubs to prevent extraction of stubs from their bores. Alternatively, the means for separably securing detachable protuberances to the respective plates can comprise threaded fastener means, e.g., bolts which extend substantially centrally of the respective plates and cooperate with nuts to hold the detachable protuberances at the outer sides of the respective plates. Each detachable protuberance can comprise one or more pins which can penetrate into soft ground if the detachable protuberances are provided on the outer plates.

If a link has protuberances at the outer sides of both plates, the thickness of the protuberance at the outer side of the base plate preferably approximates or equals the thickness of the protuberance at the outer side of the other plate, as considered at right angles to the planes of the respective plates. This renders it possible to invert the positions of the links, e.g., after extensive wear of the protuberance(s) at the outer side of one of the plates. The configuration of the protuberance or protuberances at the outer side of the base plate may but need not resemble (or be identical with) that of the protuberance(s) at the outer side of the other plate. The protuberance or protuberances at the outer side of the base plate of a link can resemble elongated strips or beads.

If the links comprise substantially square plates, the length of one side of each plate can be twice the thickness of the respective link (as measured in a direction at right angles to the planes of the plates). This preferably also includes the protuberance or protuberances at the outer side of one or both plates. For example, the length of each side of a square plate can be approximately 80 millimeters, the inner radius of curvature of the arcuate portion of each yoke can be between 12 and 13 millimeters, and the radius of the preferably circular cross-sectional outline of the web of the first shackle can be approximately 10 millimeters. The same holds true for the radii of the preferably circular cross-sectional outlines of arcuate portions of the yokes. If the projections of the links are spaced apart from the sides of the respective plates, the distance between the nearest sides and the projections can be approximately 9 millimeters, and the width of projections (as measured at right angles to the plane of the respective yoke) can be approximately 10 millimeters. The width of the detent members (as considered at right angles to the plane of the yoke of the other link) can be approximately 10 millimeters, and the width of the guide channels can be approximately 12 millimeters. The just enumerated dimensions of links and shackles are particularly advantageous in chains which are used on large tires with a diameter of up to 3.5 meters.

The yoke of the one link and the web of the first shackle preferably define a pivot axis which is located in the plane of the yoke of the one link and about which the shackle can pivot through angles of at least 30° (preferably approximately 45°) to the opposite sides of a neutral position in which the plane of the yoke of the one link is normal to the plane of the yoke of the other link. Furthermore, the yoke of the one link and the first shackle preferably define a second pivot axis which is at least substantially normal to the plane of the yoke of the one link and about which the shackle is pivotable through angles of at least 20° (preferably about 30°) to both sides of a neutral position in which the base plates of the two links are disposed in a common plane.

The band-like portion of the chain comprises a large number of links and shackles, and such links and shackles form part of a pattern including groups of four links, groups of six links, groups of eight links, groups each of which includes a set of six as well as a set of three links, groups each of which includes a set of four and a set of eight links, or any one of numerous other patterns, depending on the desired characteristics of the chain and the dimensions of the tire.

The band-like portion can consist exclusively of aforediscussed links and shackles, i.e., such portion can be assembled of only two types of components. This contributes significantly to a reduction of the initial cost as well as to lower maintenance cost of the improved chain.

The novel features which are considered as characteristic of the invention are set forth in particular in the appended claims. The improved chain itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 20 is a side elevational view of a further link with two shackles of the type shown in FIGS. 11-12 and a portion of a third link (indicated by broken lines) which is coupled to the right-hand yoke of the link;

FIG. 21 is a horizontal sectional view as seen in the direction of arrows from the line XXI—XXI of FIG. 20, an intermediate position of the upper link being indicated by broken lines;

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

DESCRIPTION OF THE PREFERRED EMBODIMENTS

Figure 1:
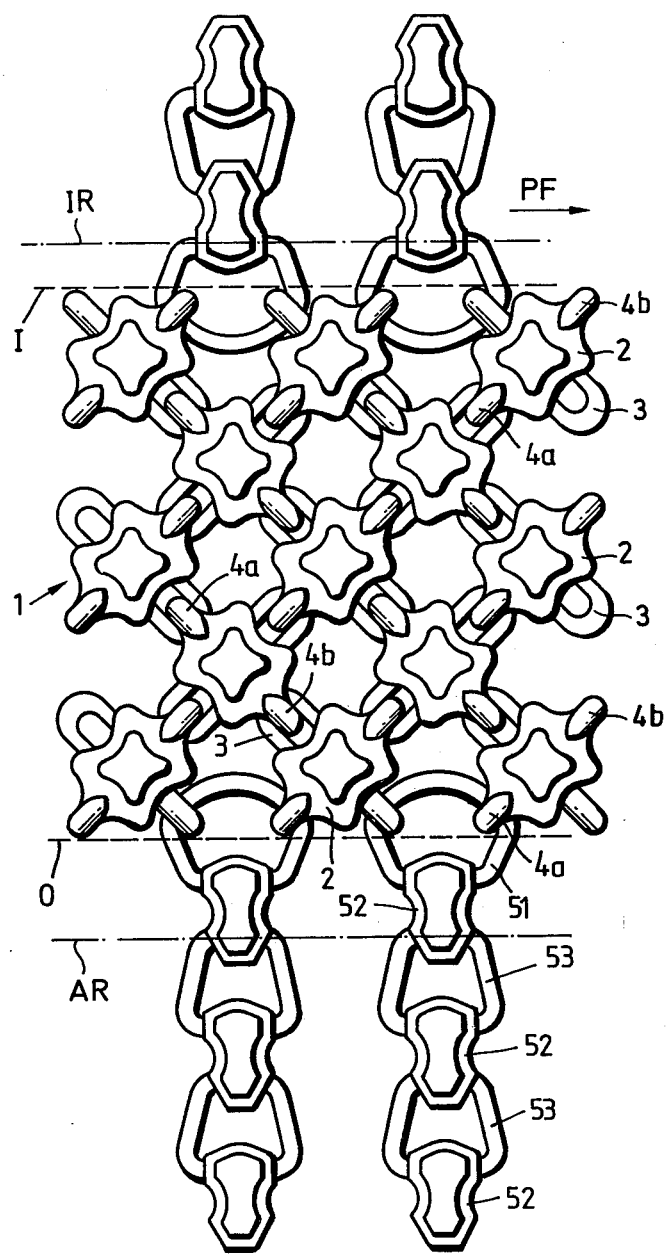
FIG. 1 is a fragmentary developed plan view of a portion of a chain which embodies the present invention and wherein the links form rows extending at right angles to each other and making angles of substantially 45° with the direction of travel of the vehicle.

FIG. 1 shows a portion of a preferably endless protecting and antiskid chain 1 which is applied around the rubber tire of an automotive vehicle, especially a high-speed heavy-duty earth moving or like vehicle. The chain 1 comprises a central portion which is disposed between the two broken lines I and O and constitutes an endless band which surrounds and contacts the tread (if any) of the tire. Such central portion or band has a predetermined width and is assembled of two types of components, namely, a plurality of center parts or main links 2 and a plurality of shackle- or staple-like coupling elements or links 3. The center parts or main links 2 are disposed in rows which intersect each other at right angles and make angles of approximately 45 degrees with the lines I and O, i.e., with the circumferential direction of the tread between such lines. The central parts 2 form a large number of substantially square patterns each of which has a center part at each of its corners and whose center parts are articulately connected to each other and to the center parts of the neighboring square patterns by discrete coupling links 3. Each of the center parts 2 is formed with two mirror symmetrical loop-shaped arcuate yokes 4a, 4b which are articulately connected with coupling links 3. The arrangement is such that each center part 2 is connected with a total of four coupling links 3, namely, a pair of links 3 which cooperate with the yokes 4 of the respective center part 2 and a pair of links 3 which are anchored in the center part and cooperate with the yokes of two neighboring center parts.

The phantom lines IR and AR denote in FIG. 1 the innermost and outermost marginal portions or edges of the tread, and the arrow PF denotes the direction of rotation of the tire which carries the improved chain 1. The marginal portions of the aforementioned band of interconnected links 3 and center parts 2 are connected with intermediate links 51 in the form of eyelets which, in turn, are connected with additional links 52 and 53 extending substantially radially of the respective side of the tire and being secured to tensioning or tightening devices which are not shown because their construction forms no part of the present invention. It suffices to say that the parts 51, 52 and 53 serve as shock absorbers as well as a means to urge the band of links 2 and 3 against that portion of the tread (if any) which extends circumferentially of the wheel between the lines I and O. It will be noted that the distance between the lines I and IR at the inner side of the tire is less than the distance between the lines O and AR at the outer side of the tire. In other words, the distance between the line IR and the nearest links 2 is less than the distance between the line AR and the nearest links 2. This is desirable and advantageous because, when the centrally located band of links 2 and 3 must be tensioned from time to time as a result of soffit wear, such tensioning can be carried out more readily and with little loss in time at the outer side of the tire. The adjustable tensioning means for the radially extending series of links 51, 52, 53 in the lower part of FIG. 1 is disposed at the outer side of the tire to be accessible without the need for detaching the tire and/or the wheel from the body of the vehicle. The absence of centering of the band of links 2 and 3 exactly midway between the lines IR and AR when the improved chain is new or practically new allows for repeated adjustment of tension to thus compensate for the aforementioned wear without moving the outermost links 2 and 3 outwardly beyond the line AR.

Figure 2:
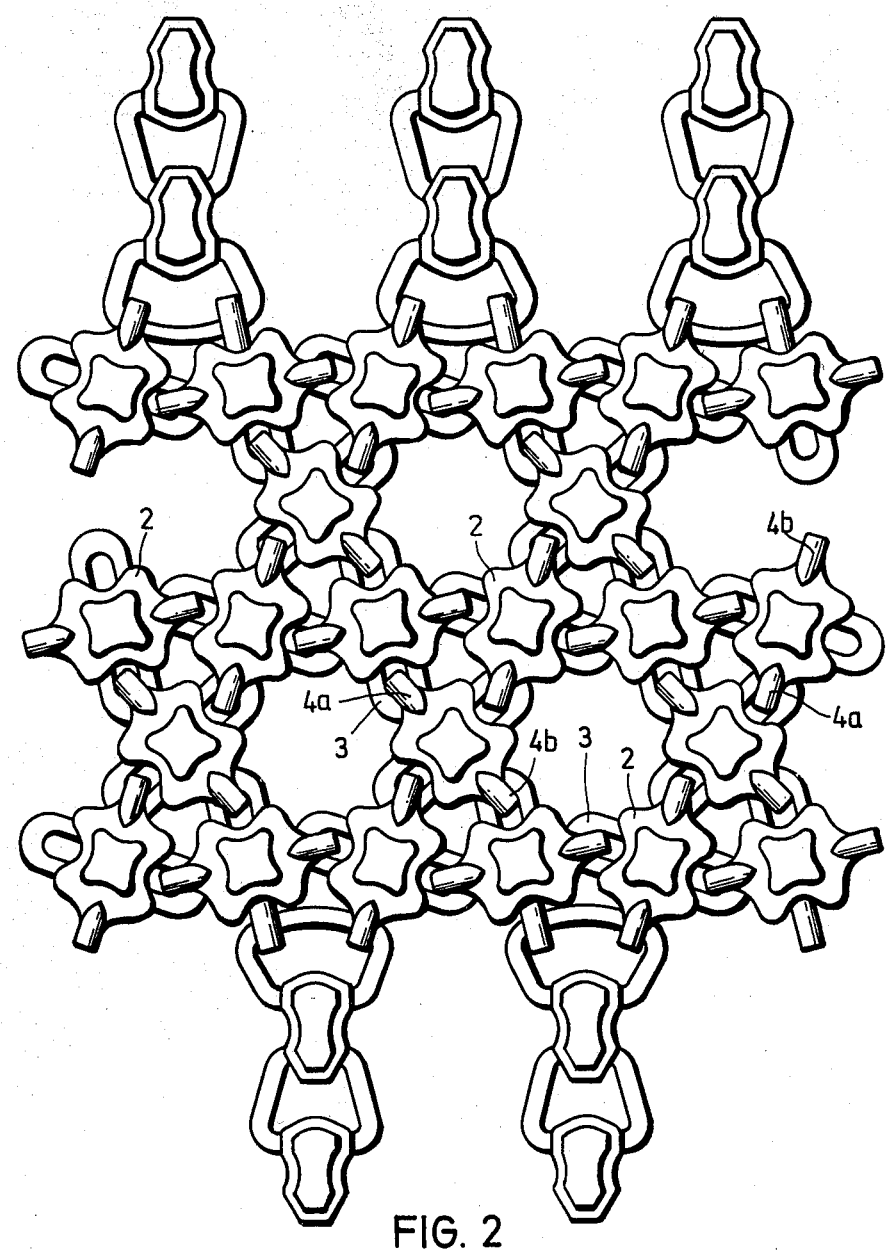
FIG. 2 is a similar fragmentary developed plan view of a modified chain wherein the links form a honeycomb pattern.
Figure 3:
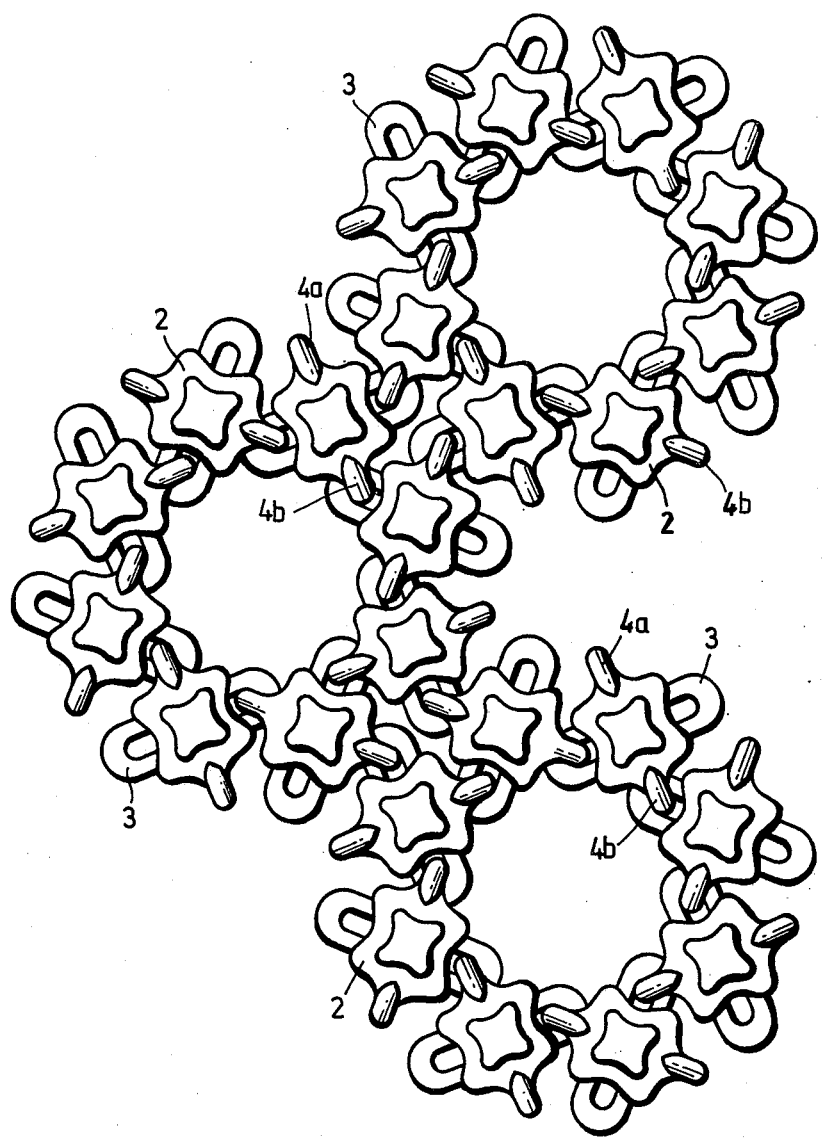
FIG. 3 is a similar fragmentary developed view of a third chain wherein the links are assembled into annuli each of which comprises eight links.

The present invention is concerned primarily with the construction and configuration of the center parts or main links 2 (hereinafter called links for short), with the construction and configuration of coupling links 3 (hereinafter called shackles for short), and with the mode of connecting the links 2 to each other by resorting to the shackles 3. FIG. 1 shows that each link 2 has a polygonal (approximately or substantially square) outline with four equal or nearly equal sides. In the pattern of the band shown in FIG. 1, one diagonal of each link 2 extends in parallelism with the axis of the tire (i.e., at least substantially at right angles to the lines I, IR, O and AR), and the other diagonal of each link 2 extends in parallelism with such lines, i.e., circumferentially of the tire. Furthermore, the pattern which is formed by the links 2 and shackles 3 of FIG. 1 is such that each of the four sides of each link 2 is spaced apart from and is substantially parallel to one side of one of the four nearest links 2. Such pattern is but one of the numerous possible arrays which can be formed by the links 2 and shackles 3. For example, FIG. 2 shows a portion of a band wherein the links 2 and shackles 3 form a substantially honeycomb-like array with each "cell" of the honeycomb including six interconnected links 2. It is equally possible to reduce the number of links 2 in each unit of the band to three or to increase such number to five, seven or even more. By way of example, FIG. 3 shows a portion of a band wherein each unit of the array of links 2 and shackles 3 comprises eight links 2, one such unit being shown on a larger scale in FIG. 3a. The latter Figure clearly shows that the yokes 4a, 4b of each link 2 are disposed opposite each other, i.e., they extend outwardly beyond two parallel sides of the respective link 2, and that each pair of neighboring links 2 is articulately connected to one another by a shackle 3 whose web cooperates with one yoke (4a or 4b) of one of the neighboring links 2 and whose legs are anchored in the other of such neighboring links. Of course, once the pattern departs from that which is shown in FIG. 1, the sides of neighboring links 2 are not parallel to each other. The array which is shown in FIG. 2 has been found to be especially suited as a means for reducing the likelihood of skidding of the tires relative to the ground, i.e., for enhancing traction of the vehicle which utilizes the improved chain. In addition, such pattern provides a highly satisfactory protection for the tire, particularly against excessive wear as well as from other damage such as from impact against pieces of sharp rock, gravel or the like.

Figure 3A:
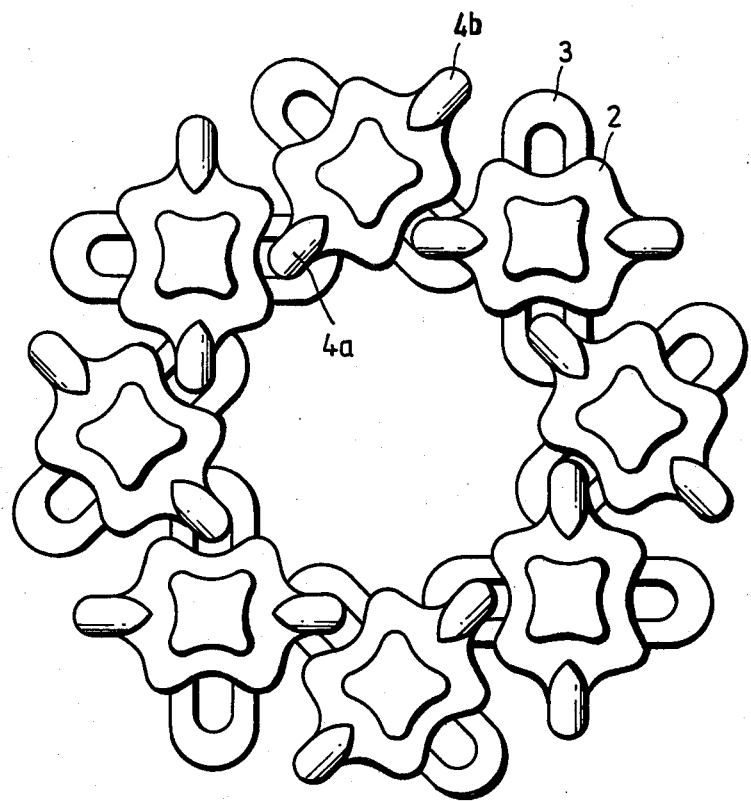
FIG. 3a is an enlarged view of a portion of the structure which is shown in FIG. 3.

The design which is shown in FIGS. 3 and 3a has been found to be particularly satisfactory for use on the tires of earth moving vehicles or of vehicles which are used in forestry. The chain of such design exhibits highly satisfactory antiskid properties, not only on soft ground (such as mud or the ground in a forest) but also in snow and on icy roads or icy ground. The vehicle which uses chains of the type shown in FIGS. 3 and 3a can be a high-speed heavy-duty vehicle with a rearwardly tiltable platform and with two or four wheels per axle. The improved chain greatly enhances the mobility of such vehicles on soft (muddy, swampy or like) terrain. The reason is that, due to the novel design of the improved links 2, each of these links lies flush or practically flush against the adjacent portion of the tire. Such positioning of the links with reference to the tire is not affected by the selection of orientation of the sides of the links 2 with reference to the lines I IR, O and AR. In other words, the orientation of links 2 with reference to such lines can be selected with a view to satisfy specific requirements in connection with a particular type of vehicle, but such orientation (to satisfy specific requirements) does not affect the stability of the links 2, namely, the ability of each link to lie at least substantially flat against the adjacent portion of the tire.

The patterns which are shown in FIGS. 1, 2 and 3-3a are but a few of those which can be used with advantage to assemble the improved chain. For example, a pattern can be assembled of groups each including a set of six plus a set of three links 2, or of groups each of which includes a set of eight and a set of four links 2. The selection of the pattern will depend on the desired overall number of links in the chain and/or on the nature of terrain on which the vehicle is to be put to use.

Figure 4:
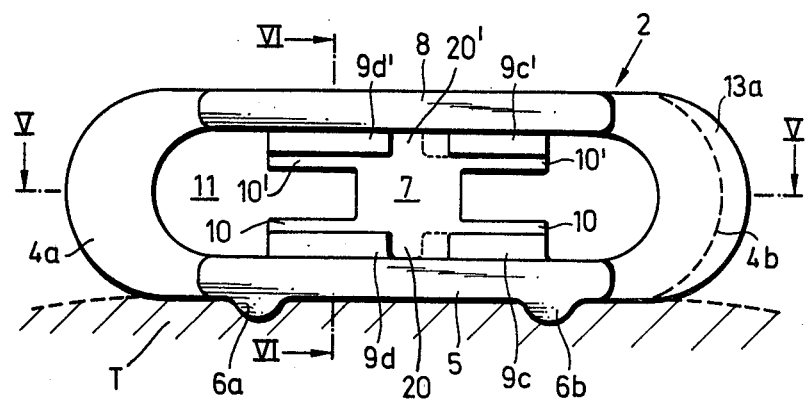
FIG. 4 is an enlarged side elevational view of a link which is constructed in accordance with one embodiment of the present invention and has two integral yokes as well as a set of projections provided at the inner side of each of its plates.
Figure 5:
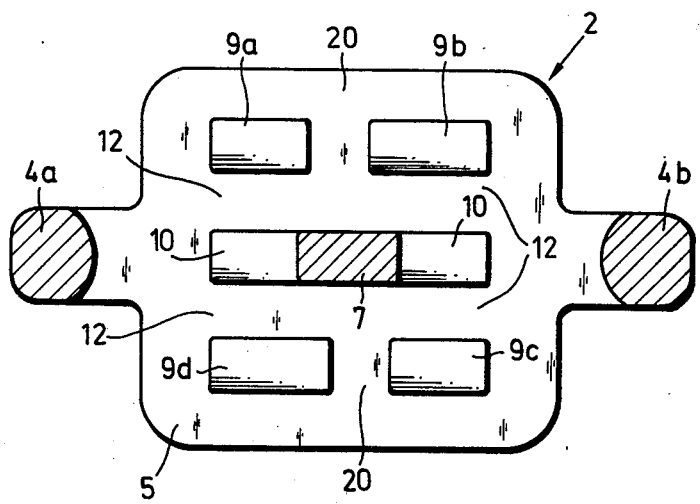
FIG. 5 is a horizontal sectional view as seen in the direction of arrows from the line V—V of FIG. 4.
Figure 6:
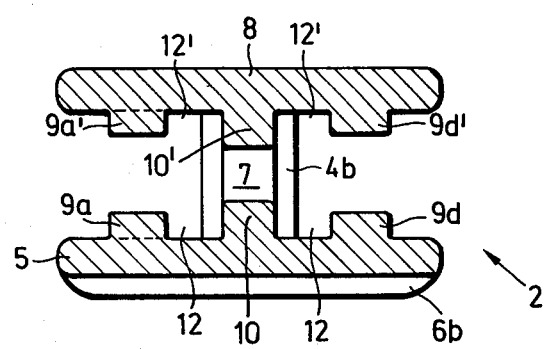
FIG. 6 is a transverse vertical sectional view as seen in the direction of arrows from the line VI—VI of FIG. 4.

One of the links 2 is shown in greater detail in FIGS. 4, 5, and 6. This link comprises a first plate or base plate 5 having two external protuberances in the form of strips or beads 6a, 6b which engage the outer side of the tread of the tire T (the outline of the tire is indicated in FIG. 4 by a broken line). The purpose of the strips or beads 6a, 6b is to prevent the plate 5 from slipping or skidding along the surface of the tread. A second or outer plate 8 of the link 2 is spaced apart from and is substantially parallel to the base plate 5; the purpose of the plate 8 is to engage the ground when the chain including the link 2 is installed on the tire of an automotive vehicle. The two yokes 4a, 4b of the link 2 are disposed in a common plane which is normal to the plane of the plate 5 or 8 and is also normal to the respective sides of the link 2, namely to those sides beyond which the yokes 4a and 4b extend. These yokes establish a rigid connection between the plates 5 and 8, and such plates are further rigidly connected to one another by a substantially centrally located projection or post 7 having a rectangular cross-sectional outline and being disposed midway between and in the common plane of the yokes 4a and 4b. FIG. 5 further shows that the yokes 4a and 4b are located at least substantially midway between those sides of the link 2 which are parallel to each other and to the common plane of the yokes. The compartment or space which is defined by the plates 5 and 8 is shown at 11.

The base plate 5 is formed with a set of four rectangular locating and retaining projections 9a, 9b, 9c, 9d which extend into the adjacent portion of the compartment 11 and spacedly surround the post 7. The outer plate 8 is also provided with four locating and retaining projections 9a', 9b', 9c', 9d' which are disposed opposite the similarly referenced locating projections 9a to 9d of the base plate 5 and which also extend into the compartment 11. The projection 9b' is not specifically shown in the drawing; it is located opposite to and in exact or substantial register with the projection 9b of the base plate 5.

The projection or post 7 is formed with two extensions 10 which are coplanar with the yokes 4a, 4b, one of which is disposed midway between the projections 9a, 9d and the other of which is disposed midway between the projections 9b, 9c. The extensions 10 are adjacent to the inner side of the base plate 5. Similar extensions 10' are provided on the post 7 at the inner side of the outer plate 8, and each extension 10' is disposed opposite to and registers with one of the extensions 10. FIG. 4 shows that the height of the extensions 10 and 10' somewhat exceeds the height of the respective projections 9a-9d and 9a'-9d', as considered at right angles to the planes of the plates 5 and 8. As shown in FIG. 6, the extensions 10 and the adjacent projections 9a-9d of the base plate 5 define four guide channels 12 (only two can be seen in FIG. 6), and the extension 10' define with the adjacent projections 9a'-9d' four guide channels 12' only two of which can be seen in FIG. 6. The guide channels 12 and 12' are parallel to the common plane of the yokes 4a and 4b.

Each of the yokes 4a, 4b has an arcuate central portion or web which has a substantially circular cross-sectional outline and is remotest from the plates 5 and 8, and two legs one of which merges into the base plate 5 and the other of which merges into the outer plate 8. The webs of the yokes 4a, 4b are interlinked or hooked into the yokes 14 (see FIGS. 7 and 8) of the corresponding shackles 3, and the legs 15, 16 of such shackles are anchored in the neighboring links 2. The legs 15 and 16 are respectively provided with detent members 17, 17' and 18, 18' which extend into the adjacent guide channels 12, 12' of the respective links 2 when the shackles 3 are properly anchored in such links. The reference character 13a denotes in FIG. 4 an enlarged portion of the yoke 4b which allows for a substantial amount of wear. Similar enlarged portions are provided on the yokes 4a of new links 2, and the same preferably holds true for the webs 14 of the shackles 3.

Pairs of neighboring projections 9a, 9b and 9c, 9d define passages 20 which extend at right angles to the common plane of the yokes 4a, 4b and post 7. Similar passages 20' are defined by the corresponding pairs of projections 9a'-9d' at the underside of the outer plate 8.

The dimensions of the link 2 which is shown in FIGS. 4 to 6 approximate the dimensions of a link as actually produced for use in the improved chain, especially in a chain for use on large tires with an outer diameter of up to 3½ meters.

Figure 7:
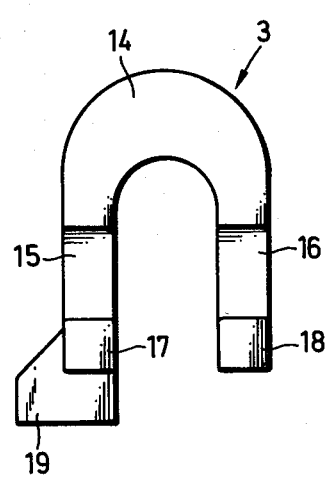
FIG. 7 is a side elevational view of a shackle which can be used with the link of FIGS. 4 to 6.
Figure 8:
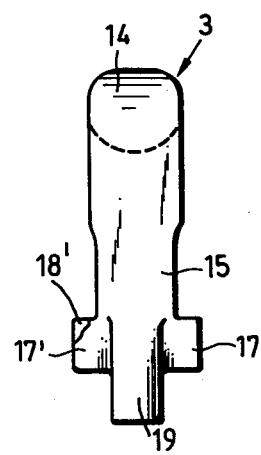
FIG. 8 is an end elevational view of the shackle as seen from the left-hand side of FIG. 7.

The details of a shackle 3 are illustrated in FIGS. 7 and 8. As mentioned above, each shackle 3 is a substantially U-shaped staple-like element with an arcuate web 14 between two substantially parallel legs 15, 16 having laterally extending projections or detent members 17, 17' and 18, 18' which cooperate with the parts in the compartment 11 of a link 2 to maintain a properly inserted shackle in anchored position, i.e., to hold such shackle against accidental detachment from the respective link 2. The detent members 17, 17' and 18, 18' are respectively provided at the free ends of the corresponding legs 15 and 16, namely at those ends of such legs which are remote from the web 14. The dimensions of the detent members 17, 17' and 18, 18' (as considered in the longitudinal direction of the legs 15 and 16) are selected in such a way that the detent members can be received, with some play, in the guide channels 12, 12' of a link 2. The thickness of the legs 15 and 16 is selected with a view to ensure that each of these legs can be inserted between a pair of registering projections, such as 9a, 9a' or 9b, 9b' or 9c, 9c' or 9d, 9d'. This can be readily ascertained by looking at FIGS. 6 and 8. The thickness of each of the detent members 17, 17', 18, 18' is such that these detent members substantially fill the respective guide channels 12 and 12'. The width of the detent members 17 to 18', as considered transversely of the respective legs 15 and 16, is selected in such a way that the detent members can be readily introduced into the compartment 11 of a selected link 2, namely, along the left-hand side of the projection 9a or along the right-hand side of the projection 9c shown in FIG. 5 as well as through the passage 20 between the projections 9a, 9b or 9c, 9d and the corresponding passage 20' between the projections 9a', 9b' or 9c', 9d'. Each of the passages 20' is disposed opposite one of the passages 20. Once a detent member 17, 17', 18 or 18' has advanced through the respective passage 20 or 20', it is free to enter the adjacent guide channel 12 or 12'.

The free end of the leg 15 of each of the shackles 3 is further provided with a locking projection or spur 19 whose width is such that it has room between a pair of registering extensions 10, 10' of the post 7 in the compartment 11 of a link 2. The spur 19 extends lengthwise of and beyond the leg 15 through a distance which matches or approximates the width of an extension 10 or 10'.

Figure 9:
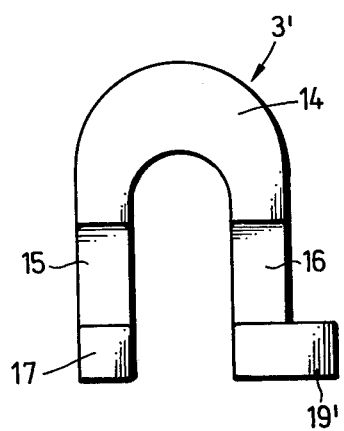
FIG. 9 is a side elevational view of a modified shackle.
Figure 10:
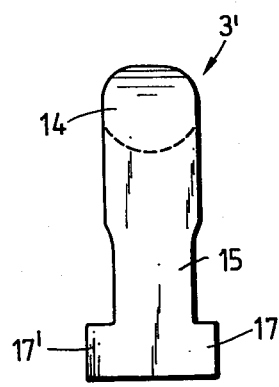
FIG. 10 is an end elevational view of the modified shackle as seen from the left-hand side of FIG. 9.

FIGS. 9 and 10 illustrate a modified shackle 3' which has a leg 16 formed with a modified spur 19' extending only transversely of the respective leg. In other words, the combined length of the leg 16 and its spur 19' does not exceed the length of the leg 15 of the shackle 3'.

Figure 11:
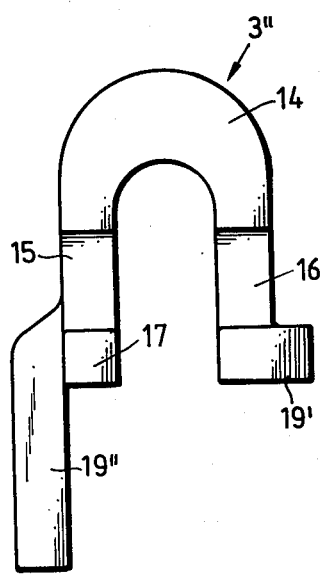
FIG. 11 is a side elevational view of a third shackle.
Figure 12:
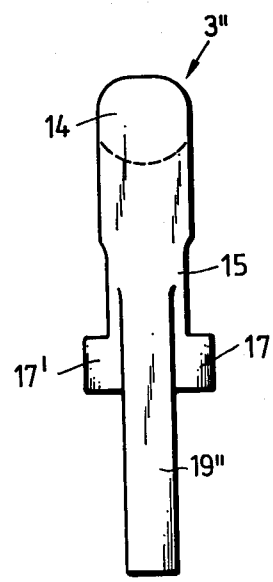
FIG. 12 is an end elevational view as seen from the left-hand side of FIG. 11.

The shackle 3" of FIGS. 11–12 comprises a first spur 19' which is similar to the spur 19' of FIGS. 9 and 10, as well as a second or additional spur 19" which contributes to the width as well as very substantially to the length of the respective leg 15.

The shackles 3' and 3" can be used in conjunction with certain modified links which will be described hereinafter. The cross-section of the web 14 of a shackle 3, 3' or 3" has a circular or substantially circular outline.

Figure 13:
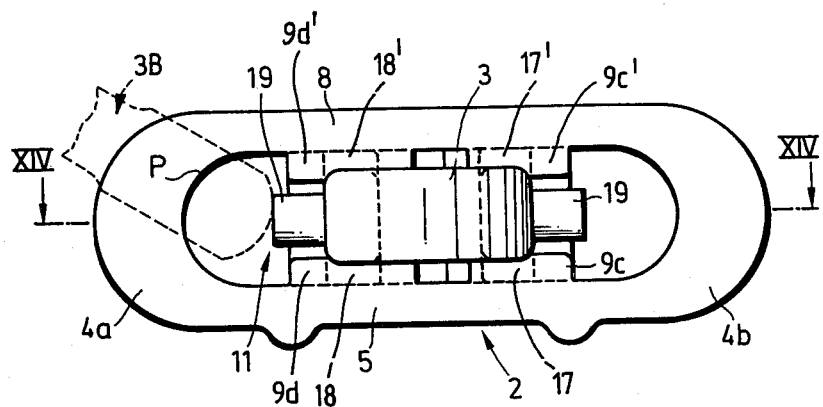
FIG. 13 is a side elevational view of a link of the type shown in FIGS. 4 to 6, with two shackles of the type shown in FIGS. 7 and 8 anchored in the compartment between the base plate and the outer plate of the link.
Figure 14:
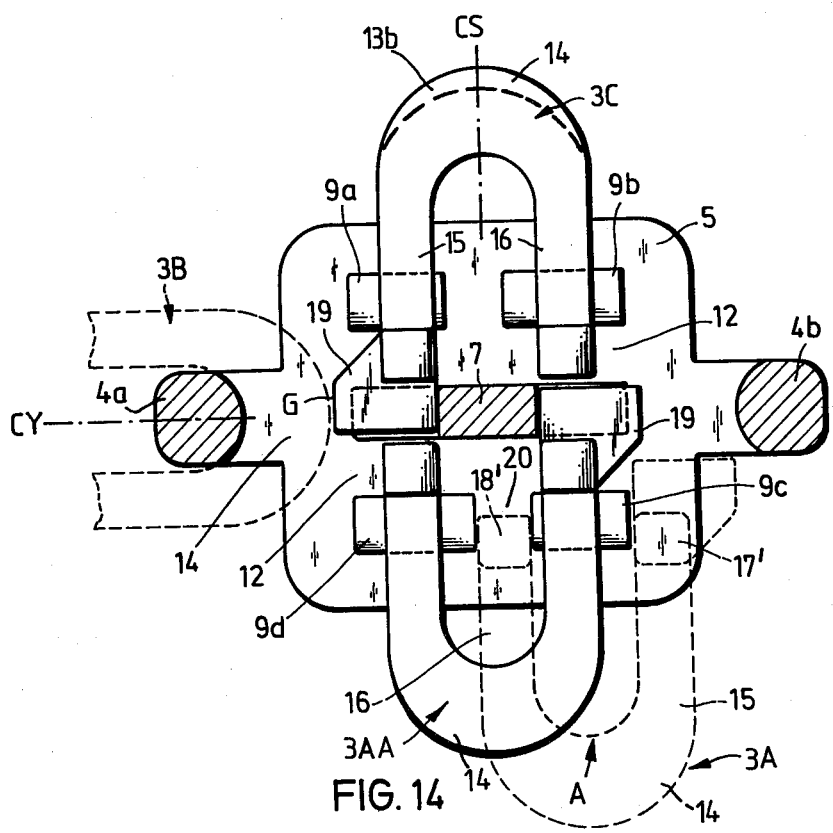
FIG. 14 is a horizontal sectional view as seen in the direction of arrows from the line XIV—XIV of FIG. 13, further showing (by broken lines) a portion of a third shackle which is coupled to the left-hand yoke of the link and (again by broken lines) an intermediate position of one of the anchored links.

FIGS. 13 and 14 illustrate the manner of anchoring shackles 3 in a link 2 and the intermediate and final positions of such shackles during and subsequent to anchoring. The shackle 3A which is shown by broken lines in the lower right-hand portion of FIG. 14 is in the process of being anchored in the link 2, namely, it is in the process of being engaged with the various projections and extensions in the compartment 11 of such link. The arm 15 of the shackle 3A is outwardly adjacent to the projections 9c and 9c' so that its detent members 17, 17' slide along the narrow right-hand sides of the projections 9c, 9c' and the spur 19 is about to enter the space between the yoke 4b and the central portion of the post 7. During such stage of insertion, the movement of the legs 15 and 16 of the shackle 3A is at right angles to the common plane of the yokes 4a and 4b. The detent members 18, 18' of the left-hand leg 16 of the shackle 3A are disposed in the passages 20, 20' (the latter is not shown in FIG. 14) between the projections 9c, 9d and 9c', 9d'. The projections 9c and 9c' are somewhat shorter than the distance between the legs 15 and 16 of a shackle (as considered in a direction parallel to the common plane of the yokes 4a and 4b shown in FIG. 14). This ensures that the projections 17, 17' and 18, 18' can penetrate into the comparment 11 at the opposite sides of the projections 9c and 9c' during movement of the shackle 3A in the direction of arrow A toward and beyond the broken-line position of FIG. 14.

The width of the spur 19 on the leg 15 of the shackle 3A is such that this spur can advance along the outer sides of and beyond the projections 9c, 9c' during movement of the shackle 3A in the direction of arrow A, i.e., that the web of the adjacent yoke 4b does not interfere with such movement of the spur 19 toward and into the common plane of the yokes 4a and 4b shown in FIG. 14. As shown in the left-hand portion of FIG. 14, the web 14 of a shackle 3B which cooperates with the left-hand yoke 4a is so close to the spur 19 of a fully inserted shackle 3C that the latter is not only anchored in but is also locked to the link 2 so that it cannot be removed except upon removal of the web 14 of the shackle 3B from the space between the yoke 4a and the projections 9a, 9a', 9d, 9d'. The width of the clearance or gap G between the web 14 of the shackle 3B and the spur 19 of the shackle 3C is such that there is hardly any room for wobbling of the shackle 3C with reference to the link 2 of FIG. 14. The shackle 3C is held against movement in the opposite direction (to the right, as viewed in FIG. 14) by the central portion of the post 7 which is located in the path of rightward movement of the spur 19.

When the insertion of the shackle 3A is completed, the latter assumes the position 3AA which is indicated by solid lines. Anchoring of the shackle 3AA in the compartment 11 of the link 2 is completed upon engagement of the web of the right-hand yoke 4b with the web 14 of a further shackle which is a mirror image of the shackle 3B and prevents the spur 19 of the shackle 3AA from moving in a direction to the right, i.e., away from a position of abutment or near abutment with the right-hand side of the main portion of the post 7.

FIG. 14 shows that the common plane of the properly anchored shackles 3AA and 3C is normal to the common plane of the yokes 4a and 4b. Furthermore, FIG. 14 shows that the common axis CS of the properly anchored shackles 3AA and 3C is normal to the common axis CY of the yokes 4a, 4b (the axis CY coincides with the line XIV—XIV in FIG. 13).

The length of the legs 15, 16 forming part of the shackles 3 is selected in such a way that the webs 14 of properly inserted and anchored shackles 3AA and 3C extend outwardly beyond the respective sides of the link 2 to the same extent as the webs of the yokes 4a and 4b project beyond the respective (remaining) two sides of the link. This is but one mode of designing the improved chain, i.e., it is also possible to employ shackles with longer or much longer legs so that the distance between the webs 14 of long-legged shackles and the respective sides of a link 2 will greatly exceed the maximum distance between the yokes 4a, 4b and the nearest sides of the plates 5 and 8. The selection of the length of legs on the shackles will determine the spacing between neighboring links 2 of the chain.

The enlarged portions 13a of the yokes 4a, 4b and the similar or analogous enlarged portions 13b of the shackles 3, 3' or 3" contribute to longer useful life of such parts. If the wear upon the webs of the yokes 4a, 4b and/or the wear upon the webs 14 of the shackles increases, the left-hand shackle 3B of FIG. 14 will move to the left, as viewed in the drawing, to provide some additional room for sidewise movements of the shackle 3C (namely, in directions to move the spur 19 of the shackle 3C away from and toward the left-hand side of the main portion of the post 7). However, the wear upon the web 14 of the shackle 3B and/or upon the web of the yoke 4a of FIG. 14 must be quite pronounced before the shackle 3C comes even close to being in a position to become detached from the link 2. This is due to the distribution and dimensioning of the projections 9a–9d and 9a'–9d' which guarantee that the shackle 3C must perform a rather pronounced leftward movement from the anchored position of FIG. 14 before its legs 15 and 16 can begin to move upwardly and out of the compartment 11 between the plates 5 and 8 of the link 2.

The right-hand portion of FIG. 14 shows that extraction of the shackle 3AA from its anchored position (which is shown by solid lines) is possible only when the shackle (not shown) which engages the yoke 4b of the link 2 has undergone a very pronounced wear which resulted in a reduction of the thickness of the web 14 of such shackle to zero or nearly zero (so that the spur 19 of the shackle 3AA can move to the broken-line position, i.e., that the shackle 3AA can assume the position of the shackle 3A which is shown by broken lines). This situation is not likely to arise because, at least in many instances, the web 14 of a shackle 3 is apt to break before it wears away to such an extent that it allows the adjacent anchored link from leaving its normal position (such as that of the shackle 3AA shown in FIG. 14). Once a shackle breaks, the movement of an adjacent shackle out of the anchored position is of no consequence, i.e., the damage to the chain as a result of shifting of a shackle from anchored position is merely cumulative if the attendants failed to detect the breakage of a shackle in good time prior to termination of proper anchoring of the neighboring shackle.

The placing of the legs 15, 16 of a shackle 3, 3' or 3" into a plane which is parallel to the planes of the adjacent plates 5, 8 and extends at right angles to the common plane of the yokes 4a, 4b forming part of a link whose compartment 11 receives the legs 15 and 16 ensures that the planes of the shackles are parallel to the exposed side of the tire. This greatly reduces the likelihood of undesirable tilting of the shackles to positions in which they would be subject to uneven wear with attendant reduction of their useful life. In other words, the tendency of the improved shackles to change their orientation with reference to the exposed side of the tire does not increase with progressing wear upon their webs 14 and/or other parts because the plane of their legs is parallel to the planes of the plates 5 and 8 between which such legs extend.

The aforedescribed enlarged portions 13 of the yokes 4a, 4b and similar enlarged portions of the webs 14 forming part of the improved shackles 3, 3' and 3" render it possible to avoid frequent replacement of worn shackles and/or links because the useful life of such parts is surprisingly long. As will be explained hereinafter, the improved chain can be assembled by the ultimate user, in a repair shop, by a wholesaler of building and analogous equipment, by a retailer or at the manufacturing plant, and the assembly and/or replacement of damaged or worn components can be performed by hand. The provision of enlarged portions ensures that the replacement of parts is infrequent so that the vehicle using the improved chain need not be idled for the express purpose of carrying out lengthy repairs on the chains, and the repair work can be carried out while the chain remains applied to the tire.

The aforediscussed selection of various radii and radii of curvature of the webs 14 and arcuate portions of the yokes 4a, 4b also contributes to longer useful life of the links and shackles because it ensures that the webs of the shackles and the arcuate portions of the yokes 4a, 4b are in mere point contact with one another. This causes much less wear than a substantial surface-to-surface contact. The cross-sectional areas of the arcuate portions of the yokes 4a, 4b and of the webs 14 are preferably circular or at least resemble circles. This, coupled with the aforediscussed selection of various radii and radii of curvature of the parts 4a, 4b and 14, ensures that the webs 14 are caused to roll (rather than slide) along the arcuate portions of the respective yokes. Such rolling movement is particularly advantageous as concerns a reduction of wear and longer useful life of the components of the improved chain. The rolling movement (in lieu of a sliding movement) is especially important when the links and shackles of the chain are subjected to pronounced stresses during travel of the vehicle on difficult terrain at building sides, in a forest, in a gravel pit, in a mine and/or under similar circumstances.

Figure 15:
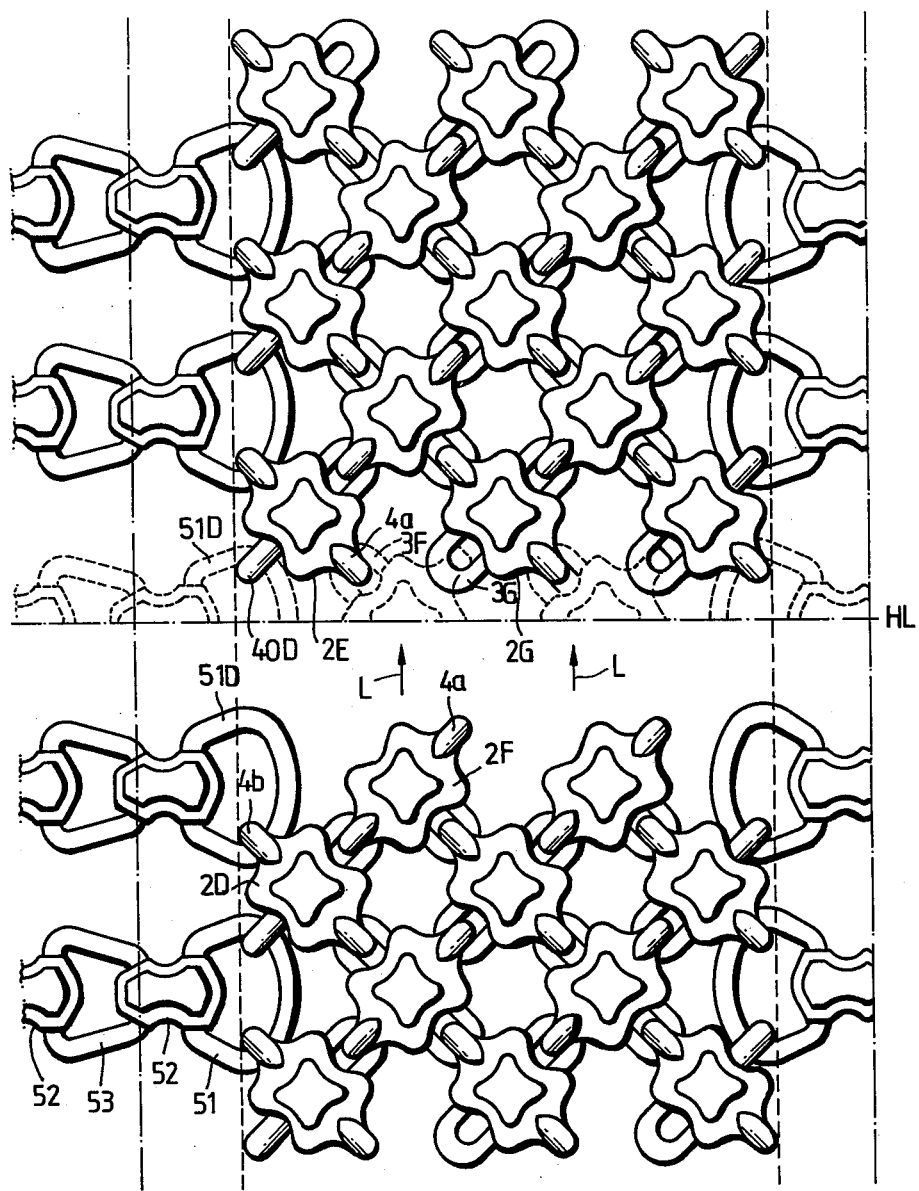
FIG. 15 is a fragmentary developed plan view of two neighboring end portions of a chain of finite length which is in the process of being converted into an endless chain, the positions of certain components of the chain upon completion of the conversion being shown by broken lines.

FIG. 15 illustrates the mode of joining the end portions of an elongated chain of finite length so as to convert the chain into an endless band-like body which surrounds the tread of a tire. For this purpose, the upper edge of the lower part of the chain shown in FIG. 15 must be lifted (arrows L) so that its components assume the broken-line positions in which they are joined to the neighboring components of the upper part of the chain (above the horizontal line HL). The marginal portions of the chain of FIG. 15 have been omitted for the sake of clarity; such marginal portions include means for holding the radially extending series of links 51, 52, 53 at the respective (inner and outer) sides of the tire.

In the first step, an intermediate link 51D is engaged with the yoke 4b of a link 2D and with the web of a shackle 40D which is then anchored in the link 2E. The shackle 40D is of the type shown in FIGS. 39 and 40. In the next step, a shackle 3F is employed to couple the link 2F to the link 2E, and a further shackle 3G is used to couple the link 2F to a link 2G. The same procedure is followed to complete the coupling of the lower portion to the upper portion of the chain which is shown in FIG. 15. Once the conversion of a chain of finite length into an endless chain is completed, the attendants resort to a suitable pneumatically or electrically operated tension or torque wrench (not shown) to pull the series of links 51, 52, 53 radially and uniformly toward the axis of the wheel so that the plates 5 of all links 2 are properly seated on the adjacent portions of the tread of the tire. For example, the series of links 51, 52 and 53 can be attached, under tension, to the chains which protect the sides of the tire, preferably with the interposition of suitable tensioning means in the form of springs or the like to thus ensure that the positions of links 2 with reference to the tread will not change, at least under normal operating conditions. Thus, flexing of the tire and/or impacts against the tire on uneven, rocky or like terrain (such as would reduce tension upon the chain) should not permit an interruption of contact between the plates 5 of the links 2 and the external surface of the tread. This greatly reduces the likelihood of skidding of the chain relative to the tire and hence the likelihood of skidding of the wheels relative to the ground. Continous abutment of base plates 5 against the tread reduces the likelihood of tilting of the links 2 and thus ensures that each and every portion of a properly applied chain which employs such links in an optimum position to prevent skidding, to promote traction and/or to produce other beneficial effects.

Adequate tensioning of the chain on the wheel of an automotive vehicle reduces the likelihood and the extent of wear. The wear upon the components of the improved chain can be reduced still further if the radii of curvature of selected portions of the shackles and corresponding or cooperating yokes 4a and 4b are selected in such a way that the web of a shackle (such as the web 14 of the shackle 3B shown in the left-hand portion of FIG. 13 by broken lines) is in mere point contact (at P) with the respective yoke (4a in FIG. 13) of the link 2. To this end, the radius of curvature of the surface at the inner side of the web 14 of the shackle 3 is smaller than the radius of curvature of the adjacent surface at the inner side of the web of the yoke 4a. The difference between the two radii of curvature may amount to approximately 20%. Such dimensioning ensures that the shackle 3B rolls along the yoke 4a if the parts 2 and 3B of FIG. 13 are caused to perform a relative movement. The just discussed mere point contact P between the parts 3B and 4a contributes significantly to a reduction of wear upon the web 14 of the shackle and/or upon the web of the respective yoke 4a or 4b.

The improved chain can be applied to all kinds of tires, especially to the tires of heavy-duty vehicles which must operate on uneven, soft, icy, snowy and/or other terrain which is not a paved road. Such chain can be used with particular advantage on tires without treads or on tires whose tread has undergone pronounced wear (e.g., up to and in excess of 50%). The links 2 of the chain readily follow the outline of the external surface of the tire when the latter is flexed or performs other movements which, as a rule, would tend to separate the links of the chain from the surface of the tire. Such other movements can develop when the vehicle is caused to travel over pieces of rock which would force a conventional chain to move its links away from the adjacent portion of the tire. Moreover, the improved chain takes up pronounced stresses when the vehicle is driven at a high speed so that such stresses cannot be applied to the tread. The chain continues to remain in contact with the tread and the formation of pockets between the chain and the tire is prevented in a highly reliable way.

The link 2 and the shackles shown in FIGS. 4 to 8 and 13–14 can be dimensioned as follows: The length of the link 2 between the two parallel sides beyond which the yokes 4a and 4b extend can be 80 millimeters; the width of the link 2 between the sides which are parallel to the common plane of the yokes 4a, 4b can equal 75–80 mm; the height of the link 2 (between the outer sides of the plates 5 and 8) can equal or approximate 40 mm; and each of the yokes 4a, 4b can extend through a distance of 25 mm beyond the respective side of the link 2. The radii of inner cross-sectional outlines of the yokes 4a, 4b and the radii of the inner cross-sectional outlines of the webs 14 can equal or approximate 10 mm; the inner radii of curvature of the yokes 4a, 4b can equal or approximate 12.5 mm; the distance between the projections 9a–9d and 9a'–9d' on the one hand and the nearest sides of the link 2 on the other hand can equal 9 mm, as measured at right angles to the common plane of the yokes 4a, 4b, and 12 mm, as measured in the direction of the axis CY shown in FIG 14; the width of the guide channels 12 and 12' can equal or approximate 11 mm; the width of the legs 15, 16 and of the detent members 17, 17', 18, 18' equals or approximates 10 mm so that such parts can readily enter the passages 20, 20' whose width is preferably about 11 mm; the maximum thickness of the webs of the yokes 4a, 4b and of the webs 14 can be approximately 17 mm; the width of the spurs 19 may be about 20 mm (as considered transversely of the legs 15); and the cross-sectional area of the central portion of the post 7 can be 10 times 20 mm. The above is but one example of the dimensions which can be selected to ensure proper fitting of the shackles 3 and yokes 4a, 4b into one another as well as to ensure adequate anchoring of the legs 15, 16 of the shackles 3 in the compartment 11 of a link 2.

Each of the heretofore described links 2 has a rectangular (nearly square) outline. Such types of links are especially useful in the chains for heavy-duty earth moving machines which employ very large tires, e.g., tires having outer diameters of up to 3½ meters. As shown in FIG. 1, the links 2 are assembled in such a way that their sides make angles of approximately or exactly 45° with the direction of forward or rearward movement of the wheels. However, it is equally within the purview of the invention to assemble the links 2 in such a way that two of their sides are parallel with and the remaining two sides are normal to the direction of movement of the tires.

An important advantage of a chain which comprises the improved links and shackles is that the endless bandlike central portion of the chain must be assembled of only two types of components, namely, links 2 or analogous links and shackles 3 or analogous shackles. Another important advantage of the improved chain is that even a very pronounced wear upon the webs of the shackles and/or upon the arcuate portions of the yokes is highly unlikely to result in accidental detachment of shackles from those links wherein the legs of the shackles are anchored, e.g., in a manner as shown in FIGS. 13 and 14. This constitutes an important improvement over the chain which is disclosed in the aforementioned Canadian Pat. No. 182,055.

Another important advantage of the improved chain is that the angular position of the base plates 5 with reference to the outer side of the tread on a tire remains unchanged, i.e., that the links 2 are not likely to change their orientation relative to the tread. This results in more predictable wear upon the parts of the improved chain and ensures longer useful life, even when the chain is used under most adverse circumstances. Moreover, predictable wear upon the components of the chain allows for inversion after a certain period of wear upon the outer plates 8 so that the useful life of the improved chain can be doubled (as compared with that of heretofore known chains) by the novel expedient of ensuring that the orientation of the links 2 with reference to the exposed surface of the tire T does not change or, at the very least, that the exposed sides of the base plates 5 of all links 2 remain in continuous contact with the tire. This might necessitate some adjustment of tensioning from time to time but the net result is an extension of the useful life of the chain well beyond the useful life of conventional chains which are now in use for analogous purposes. The thickness of a link 2, as considered at right angles to the planes of its plates 5 and 8, is preferably not more than half the length of one side of the plate 5 or 8, i.e., the links 2 are relatively thin and flat and this also contributes to retention of the base plates 5 in practically uninterrupted contact with the exposed surface of the tire, even when the vehicle travels on highly uneven terrain and the consistency of the ground is highly conducive to tilting of the links with reference to the exposed surface of the tire. Such retention of base plates 5 in continuous contact with the tire ensures predictable wear upon the outer plates 8 with the aforediscussed beneficial results, particularly as regards the useful life of the chain and the possibility of turning the chain inside out after a certain period of wear upon the outer plates 8. As explained above, a serious drawback of practically all conventional chains is that their links and/or parts of such links and/or other parts of the chains undergo one-sided (unpredictable) wear so that the chains cannot be inverted and the one-sided wear necessitates replacement of the chains with new chains after relatively short periods of use, i.e., after periods of use which are much shorter than if the parts of conventional chains were able of undergoing a predictable wear such as would allow for full consumption of those portions of the components of such chains which are specially designed to undergo wear and/or are dimensioned to be capable of functioning properly even after extensive wear, provided that the wear progresses in a manner as hoped for by the manufacturer.

Another important advantage of the improved chain, and more particularly of the feature that the chain comprises a surprisingly small number of different components, is that the repair work is simple and does not consume much time. Moreover, it is not necessary to maintain in stock of a substantial number of different parts. The parts of the improved chain are so simple and easy to install that they can be assembled by hand or by resort to rudimentary tools. As has been explained in connection with FIG. 15, the conversion of a band of finite length into an endless band-like structure which can be applied around the tread of a tire does not require the use of any parts other than the two basic components, namely, the main links and the shackles. Additional parts of somewhat different design are needed or desirable merely for attachment of the marginal portions of the band to tensioning and retaining means at the sides of the tire. Moreover, the radially extending parts of the improved chain are also simple and the number of different radially extending parts is also small so that the repair work on such radially extending parts of the chain is equally simple and can be carried out by storing a relatively small number of different components. There is no need for so-called seams which are indispensable in conventional chains to convert bands of finite length into endless bands and/or to attach such bands to the lateral portions of the chains. The seams are subject to extensive wear, and their parts are likely to break more readily than the other parts so that the provision of seams is one of the main causes of defects of conventional chains and of the need for frequent repairs.

Still another important advantage of the improved chain is that its components need not be made by welding. This applies not only for the endless band-like portion of the chain which surrounds the tread but also for the lateral portions which shield the inner and outer sides of the tire. Furthermore, this holds true irrespective of the size and/or shape of the tires and also irrespective of the exact configuration of the links 2 and shackles 3, 3' or 3". This eliminates the need for highly expensive automatic welding equipment and renders it possible to assemble the chain from a small number of modules which need not be subjected to any secondary treatment, either prior or after assembly into a chain. In fact, while it is evidently possible to design automatic machinery for assembly of the links and shackles which constitute the improved chain, such automatic machinery is not necessary because the assembly by hand or by resort to rudimentary machines (e.g., devices for feeding various components to the locus of assembly) is simple and inexpensive. The chain can be assembled in the manufacturing plant, in the workshop of the distributor of parts of building and like equipment, or in the workshop of the ultimate consumer, i.e., by the owner or user of the vehicle. One and the same type of components (links 2 or analogous links and associated shackles) can be used with equal facility for the assembly of large-diameter, small-diameter, wide, narrow, treaded or treadless tires.

A further advantage of the improved chain, and more particularly of the feature that the component parts of the chain need not be made and/or assembled by resort to welding equipment, is that the material of the links and shackles can be selected practically at will, e.g., exclusively with a view to allow for inexpensive mass-production and to enhance the desirable characteristics of the chain. For example, the parts (especially links) which come in direct contact with the ground (particularly rock) can be made of alloyed or unalloyed steel, of alloyed tempered steel, or of high-carbon manganese steel. The shackles can be made of highly wear-resistant spring steel. Thus, the selection is much greater than in connection with chains which comprise welded components, i.e., wherein the selection of metallic material is dependent upon the ability of such material to be welded at a halfway reasonable cost and without unduly affecting the ability of the parts to stand the stresses and wear when assembled into a chain which is applied to the tire of a heavy-duty vehicle. Moreover, welded seams are invariably a frequent cause of breaks, even if the selected material can be readily welded. Therefore, manufacturers of conventional chains which employ welded parts must resort to secondary treatment, i.e., they use steel which can be welded but also requires heat-treatment upon completion of the welding operation. Such heat-treatment normally involves diffusion of carbon through the surfaces of welded parts. The just mentioned secondary treatment is quite expensive and time-consuming. Moreover, such secondary treatment is normally beneficial only to a relatively thin outer layer of the welded seam so that its effects are felt only while the thin layer lasts. Once such layer has been eliminated by wear, the remaining part of the welded component is just as vulnerable as in the absence of any secondary treatment.

The components of the improved chain are preferably formed by drop forging and require no secondary treatment of any kind.

The provision of the aforediscussed projections 7 and 9a to 9d' in the compartments 11 of the links 2, and the provision of detent members on the legs of the shackles 3, 3' or 3" renders it possible to assemble the links and the shackles by hand in a time-saving operation and with a minimum of effort. For the same reason, the components of the improved chain can be readily detached from one another (e.g., for replacement by new components) with equal ease. Moreover, removal of damaged or destroyed links and/or shackles can be carried out prior to attachment of the chain to a tire, subsequent to removal of the chain from the tire or while the chain remains applied to the tire. Thus, such replacement does not necessitate delivery of the vehicle to a repair shop or the use of the vehicle without one or more chains because the repair work can be completed at the locale of use, as long as the user of the vehicle maintains a reasonable supply of spare links and shackles. As explained in connection with FIGS. 13 and 14, anchoring of a shackle 3 in the selected link 2 merely involves a movement of the shackle in a plane which is substantially normal to the common plane of the yokes 4a, 4b on the selected link and, once the detent members 17–18' have entered the respective guide channels 12 and 12', the direction of movement of the shackle is changed so that the detent members move lengthwise of the respective guide channels 12 and 12', i.e., in parallelism with the common plane of the yokes 4a, 4b forming part of the selected link. Such utter simplicity of assembly of the links 2 and shackles into and endless chain renders it possible to avoid the assembly in the manufacturing plant if the assembly at the locale of use is more economical, e.g., because the chain is to be used in a developing country where the cost of labor is low in comparison with the wages of workers in industrialized countries. Thus, all the manufacturer has to do is to ship adequate supplies of links and shackles to a retailer, to a wholesaler or to the ultimate purchaser. Such do-it-yourself principle of assembling the improved chain can bring about substantial savings to the manufacturer and particularly to the ultimate purchaser if the purchaser is willing and able to assemble the chain, or to have the chain assembled, from scratch. Moreover, such simplicity of assembling the chain also contributes to its versatility because the purchaser can readily convert a larger chain into a smaller chain or add a certain number of links and shackles to convert a smaller chain into a larger chain so that one and the same set of links and shackles can be used to protect the tires on different types of vehicles. Such convertibility involves not only a lengthening or shortening of the endless band but also a widening or narrowing of the band, depending on the dimensions of the tires. Still further, and if the need arises due to transfer of a vehicle from one locale to another locale where the vehicle is used for a different purpose or on different ground, the owner of the chain can have the chain taken apart and reassembled in order to change the pattern of links and shackles therein (e.g., to convert a chain of the type shown in FIG. 1 into a chain of the type shown in FIG. 2 or 3) if the changed pattern exhibits more desirable antiskid and/or other properties on a particular terrain. Changes in pattern can also become necessary if the dimensions of the chain are increased or reduced or if the chain is to be transferred from a tire having a pronounced tread onto a tire whose tread has undergone extensive wear or onto a treadless tire. If desired, the improved chain can be offered for sale in a particular size (e.g., the smallest size) with an extra kit of spare links and shackles enabling the purchaser to convert the chain into a larger-diameter chain, into a wider chain or into a chain whose band-like portion exhibits a different pattern or array of links and shackles. For example, the purchaser can convert a chain which is designed to merely constitute a protective envelope for the tire into a chain which greatly enhances traction of the wheel, into a chain which is especially suited for use on vehicles which are not, or are not likely to be, used on paved roads or vice versa. Still further, the chain can be converted from an envelope for a single tire into an envelope for two neighboring tires, e.g., on the neighboring tires of earth moving vehicles wherein certain axles carry pairs of wheels having tires which require protection and/or improvement of their antiskid properties by resort to chains.

The provision of a centrally located projection or post 7 with its extensions 10 and/or 10' contributes to more reliable guidance of the detent members to their final or optimum positions in which the legs of the shackle are safely anchored in the compartment 11 of the link 2. Each such link is articulately connected with four neighboring links. The extensions 10, 10' of the post 7 cooperate with the groups of projections 9a–9d' (the projections 9a, 9b, 9a', 9b' constitute a first group at one side and the projections 9c, 9d, 9c', 9d' constitute a second group at the other side of the plane including the yokes 4a, 4b of the respective link 2) to define the aforediscussed guide channels 12 and 12', and the projections of each group define one or more passages (20, 20') for introduction of detent members into the corresponding guide channels. It has been found that the provision of the post 7 and its extensions 10, 10' contributes significantly to reliability of anchoring of the legs of the shackle in the compartment 11. Moreover, the post 7 also contributes to the ability of the outer plate 8 to stand pronounced stresses during travel of the vehicle on rough terrain by ensuring that the angular position of the plate 8 with reference to the plate 5 remains unchanged. In fact, the post 7 greatly enhances the strength of the entire link 2 in addition to its function as one of the projections which are disposed in the compartment 11 (preferably in the common plane of the respective yokes 4a, 4b) to define portions of the guide channels 12 and 12'. Still further, the post 7 can serve as an abutment or stop for the spurs 19, 19' or 19" of the properly inserted and anchored shackles 3, 3' or 3".

The projections 9a, 9a', 9b, 9b' of one group are preferably mirror symmetrical to the projections 9c, 9d, 9c', 9d' of the other group with reference to the common plane of the respective yokes 4a and 4b. This simplifies the task of the person or persons assembling the chain because the attachment of each of the two shackles which are to be anchored in the compartment 11 of a link 2 involves the same sequence of steps. This will be readily appreciated by looking at FIG. 14 which shows that the position of the shackle 3AA will coincide with that of the shackle 3C if the structure of FIG. 14 is turned through 180° in the plane of the drawing. Moreover, the aforediscussed distribution of projections 9a to 9d' allows for equally simple removal of a selected shackle and replacement or reinsertion of such removed shackle by persons possessing a minimum of skill and/or experience. The replacement or reinsertion can be carried out without resort to any special tools and while the chain remains applied to the tire. The absence of need for removal of the chain for the purposes of repair constitutes a highly desirable feature which contributes to lower cost of repair work and reduces the intervals of idleness of the vehicle for the purpose of replacing a damaged or destroyed component of the chain.

Referring again to FIG. 15, the absence of need for any specially designed parts to connect the two ends of a finite band-like portion to one another contributes to lower initial cost of the chain and prolongs the useful life of the chain because the strength of the joint between the two ends is just as satisfactory as the strength of any other part of the fully assembled endless band-like portion of the chain. This ensures that the improved chain does not exhibit weak spots which would be subject to more pronounced wear and/or rapid breakage in actual use. Thus, the homogeneousness of the improved chain is much more satisfactory than that of aforediscussed conventional chains which have seams at the locations of conversion of bands of finite length into endless bands as well as along the marginal portions of the endless band.

Figure 16:
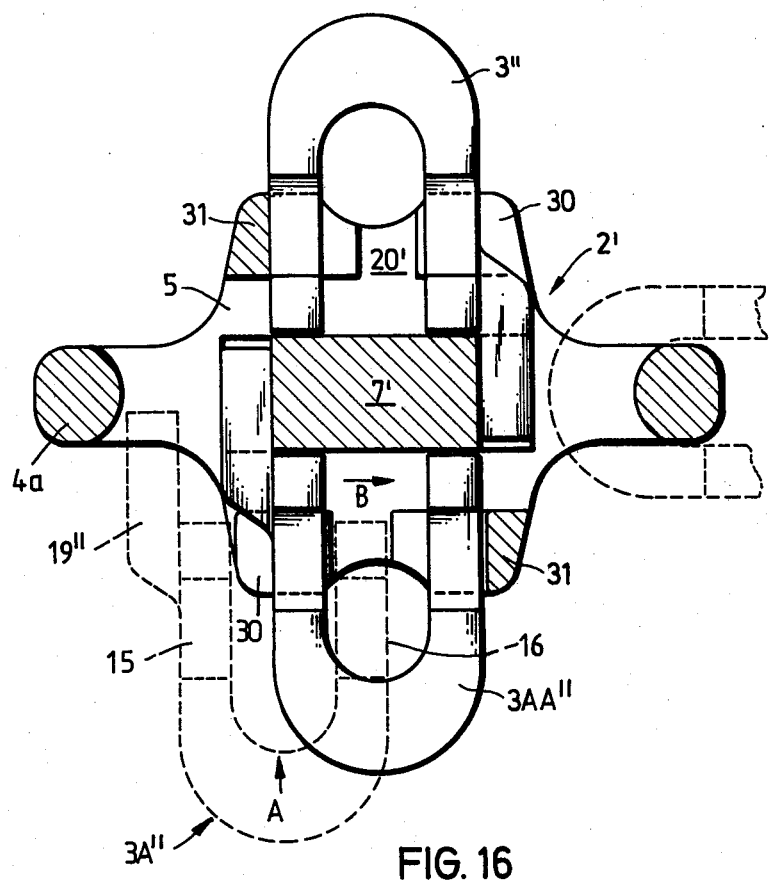
FIG. 16 is a horizontal sectional view of a modified link with two shackles of the type shown in FIGS. 11 and 12 anchored between its plates, an intermediate position of one of the shackles and a portion of a third shackle being shown by broken lines.

FIG. 16 shows a link 2' which can be used in combination with shackles 3" of the type shown in FIGS. 11 and 12. The projections 9a–9d of the link 2 are replaced with two projections 30 which are disposed diagonally opposite each other and form part of the base plate 5, and with two projections 31 which are also disposed diagonally opposite each other and connect the base plate 5 with the outer plate (not shown), the same as the centrally located projection or post 7'. The projections 30 and 31 are disposed at the four corners of the link 2'. All of these projections are or can be engaged by portions of properly inserted and anchored shackles 3". The manner in which the insertion of a shackle 3" proceeds is shown by broken lines in the lower left-hand portion of FIG. 16. The shackle 3A" is in the process of being inserted into and anchored in the compartment between the two plates of the link 2'. The direction of insertion (during the initial stage) is indicated by the arrow A. The leg 15 of the shackle 3A" slides along the outer side of the lower left-hand projection 30 and the spur 19" moves inwardly of the left-hand yoke 4a. The movement in the direction of arrow A is terminated when the tip of the leg 16 of the shackle 3A" strikes against the underside of the post 7', as viewed in FIG. 16. The direction of movement of the shackle 3A" is then changed from A to B so that the spur 19" strikes against the left-hand side of the post 7'. This is the final or anchored position of the shackle 3A", and such position is shown by solid lines, as at 3AA".

It will be noted that, in each of the heretofore described embodiments of the improved shackle, the single spur or at least one of several spurs on a shackle is positioned in such a way that it is adjacent to the nearest yoke 4a or 4b. This ensures that, when such nearest yoke is engaged by the web 14 of a shackle 3, 3' or 3", the properly anchored shackle has little room for stray movements relative to the link 2 or 2'. Thus, in spite of the surprisingly simple design of the improved links and shackles, the legs of the shackles are safely anchored in the respective compartments 11 because the spurs cooperate with the adjacent webs 14 to hold the detent members in the respective guide channels regardless of the magnitude of stresses to which the chain is subjected in actual use. The provision of spurs on the legs of shackles which are used in chains of the type to which the present invention pertains constitutes a radical departure from the design of heretofore known shackles.

The links 2 and 2' of the heretofore described chains are provided with pairs of coplanar yokes 4a and 4b. The plane of such yokes is normal to the common plane of the shackles 3, 3' or 3" when the shackles are properly anchored in the link 2 or 2'. In certain instances, it is advisable or even necessary to use modified links each of which has a single integral yoke and is coupled to more than two shackles. For example, such types of links can be used adjacent to marginal portions of the endless band of a chain whereby the third shackle serves as a means for connecting a marginal link to the adjacent intermediate link of the means for attaching the endless band of the improved chain to the chains which shield the sides of the tire. It is also possible to provide the links of the improved chain with one or more separable yokes, and the means for anchoring the separable yoke or yokes in the respective link (i.e., between the base plate and the outer plate of the respective link) can be analogous to the aforedescribed means for anchoring the shackles 3, 3' or 3" in the compartment 11 of a link 2 or 2'.

The assembly of links and shackles into a chain which embodies the present invention is made possible by ensuring that the links and shackles have a certain freedom of movement relative to one another. Moreover, at least some movements of neighboring links relative to each other are necessary and desirable in response to flexing of the tire; such flexing can necessitate a movement of one link relative to the neighboring link or links in a plane which is normal or substantially normal to the exposed side of the tread of the tire. The movability of links which form part of one and the same chain can be effected in a manner as illustrated in FIGS. 17 and 18.

Figure 17:
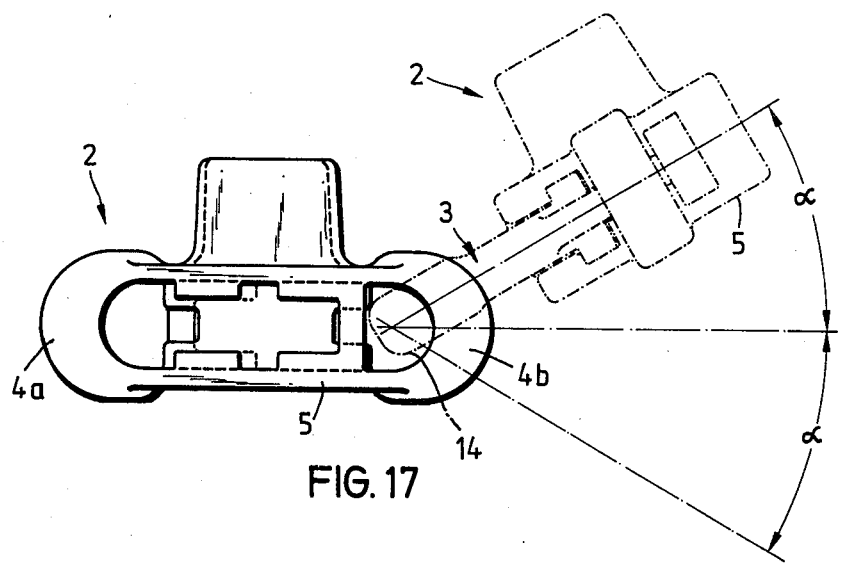
FIG. 17 is a side elevational view of two neighboring links and of a shackle which connects the links to each other so that the links can pivot relative to one another about an axis which is normal to the common plane of the yokes of the left-hand link, the right-hand link and the shackle being shown by phantom lines and in one of the two end positions with reference to the left-hand link.

FIG. 17 shows two links 2 which are coupled to each other by a shackle 3 whose web 14 is interlinked with the yoke 4b of one of the links 2 and whose legs are anchored in the compartment between the plates of the other link. The right-hand link 2 is pivotable relative to the left-hand link (and/or vice versa) between a central or median position (not shown) in which the base plates 5 of the two links are coplanar or nearly coplanar, a first end position (shown by phantom lines) in which the two base plates make a first angle alpha, and a second end position in which the two base plates make another angle alpha at the other side of the median position. The angle alpha should not be less than 20° and is preferably in the range of 30°. The pivot axis of the shackle 3 is normal to the common plane of yokes 4a, 4b forming part of the left-hand link 2.

Figure 18:
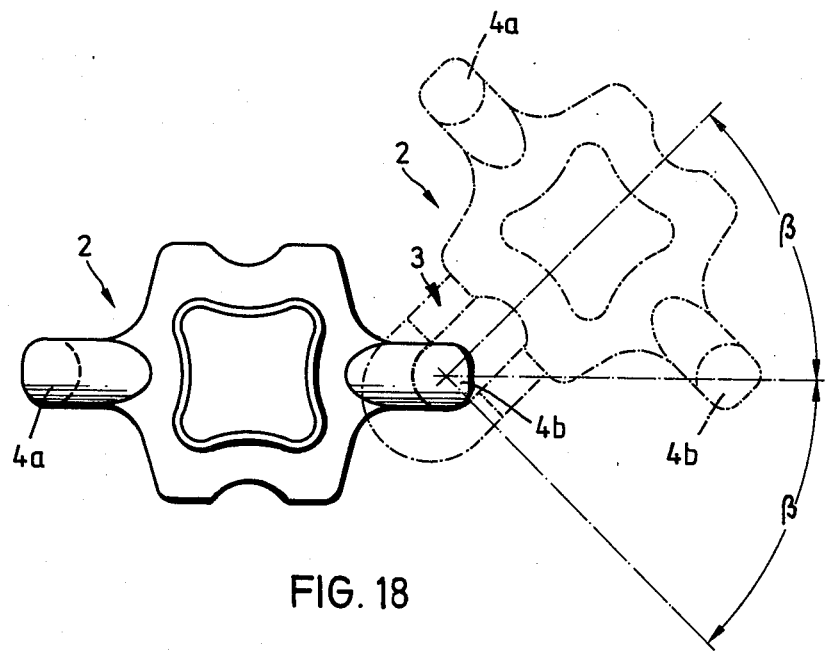
FIG. 18 is a plan view of two interconnected links, showing the manner in which the links can pivot relative to each other about an axis which is located in the planes of the yokes of such links, one of the links and the shackle being shown by phantom lines and in one of two end positions with reference to the other link.

FIG. 18 illustrates that two neighboring links 2 are, or can be, coupled to each other by a shackle 3 in such a way that they remain in a common plane but that either thereof can be swung between a first end position which is shown by phantom lines, a second end position which is a mirror image of the first end position with reference to a plane including the yokes 4a, 4b of the left-hand link 2, and a neutral position in which the common plane of the yokes 4a 4b of the right-hand link 2 is normal or nearly normal to the common plane of the yokes 4a, 4b of the left-hand link 2. Each of the angles beta shown in FIG. 18 is preferably not less than 30° and each such angle most preferably equals or approximates 45°.

Pivotability or mobility of neighboring links with reference to one another in a manner as illustrated in FIGS. 17 and 18 is desirable and advantageous for convenient assembly of links with shackles as well as for rapid and convenient replacement of a damaged or broken link or shackle. Moreover, and as already mentioned above, such articulate mounting of the links and shackles is desirable when the chain is in actual use because the links can readily follow the outer side of the tread even if the tire undergoes deformation as a result of engagement of the adjacent link or links with hard rock or the like.

Figure 19:
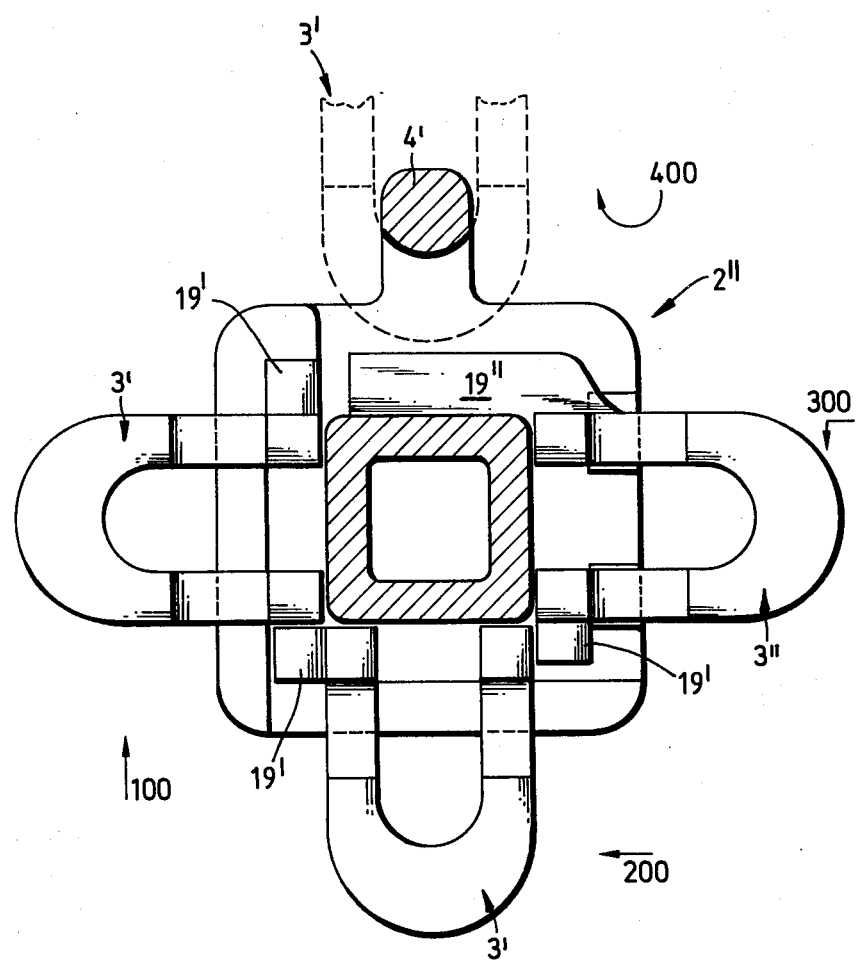
FIG. 19 is a somewhat schematic horizontal sectional view of a third link which has a single yoke and is assembled with three shackles including two shackles of the type shown in FIGS. 9-10 and one shackle of the type shown in FIGS. 11-12.

FIG. 19 shows a link 2" which has a single integral yoke 4' and can be coupled with a total of three shackles including two shackles 3' of the type shown in FIGS. 9 and 10 as well as one shackle 3" of the type shown in FIGS. 11 and 12. The spurs 19' of the shackles 3' and the spurs 19', 19" of the shackle 3" are dimensioned and oriented in such a way that, when the yoke 4' is coupled with a fourth shackle (e.g., a shackle 3' which is indicated in FIG. 19 by broken lines), the shackle 3" is locked in the anchored position and prevents the adjacent shackle 3' (at the six o'clock position of the link 2") from leaving the illustrated position whereby the just mentioned shackle 3' prevents the other (left-hand) shackle 3' from leaving the illustrated anchored position. At least the final stage of movement of the left-hand shackle 3' takes place in the direction of arrow 100; at least the last stage of movement of the lowermost shackle 3' of FIG. 19 takes place in the direction which is indicated by the arrow 200; and the final stage of insertion and anchoring of the shackle 3" takes place in the direction of arrow 300. The arrow 400 indicates the direction of movement of the broken-line shackle 3' into engagement with the single yoke 4' of the illustrated link 2". As mentioned above, coupling of the topmost link 3' to the yoke 4' locks the other three links in anchored positions, anchoring of the shackle 3" locks the left-hand and lowermost shackles 3' in anchored positions, and anchoring of the lowermost shackle 3' locks the left-hand shackle 3' in anchored position.

FIGS. 20 and 21 illustrate a further embodiment of the improved chain which employs very thin links 102. This is made possible by using shackles 33 whose detent members and spurs are coplanar with the legs of such shackles so that the height of the compartment between the base plate 5 and the outer plate 8 of the link 102 can be reduced to a minimum. The manner in which the legs 15, 16 of such shackles 33 are anchored in the link 102 can be seen in FIG. 21. The detent members 32 on the legs 15 of the shackles 33 extend laterally, i.e., they are disposed in a plane between the planes of the plates 5 and 8 of the link 102. The detent members 32' of the legs 16 are coplanar with the detent members 32, and the same holds true for the spurs 19 of the legs 16. The detent members 32 simply engage behind projections 31 which connect the plates 5 and 8 to each other and are spaced apart from the centrally located projection or post 7 of the link 102. The placing of detent members 32 and 32' into a common plane which is normal to the common plane of the yokes 4a, 4b contributes to compactness of the shackles 33 as well as to compactness of the link 102. In other respects, the shackles 33 resemble the shackle 3" of FIGS. 11 and 12, and the spurs 19 of the two shackles 33 shown in FIG. 21 are held against extraction from the compartment between the plates 5 and 8 of the link 102 as soon as the adjacent yokes 4a, 4b are properly engaged by the webs 14 of additional shackles 33 (a portion of one such additional shackle is shown in the right-hand portion of FIG. 21).

The detent members 32 and 32' extend laterally in the direction in which the respective shackle 33 is moved to its final fully anchored position, i.e., in parallelism with the common plane of the projection or post 7 and yokes 4a, 4b. The thickness of a link 102 which cooperates with shackles 33 need not exceed the combined thickness of its plates 5, 8 plus the thickness of the leg 15 or 16 of a shackle 33. Thus, and if compared with the previously described links 2, 2' or 2", the thickness of the link 102 can be reduced by the combined thickness of the detent members 17, 17' or 18, 18'. All this is attributable to the fact that the detent members 32, 32' of the shackles 33 are located in the planes of the respective legs 15, 16. A reduction of the thickness of the links contributes to a considerable reduction of the overall weight of the entire chain and further reduces the likelihood of tilting or other undesirable movements of the link 102 with reference to the exposed surface of the tire. A reduction of the weight is desirable because it brings about savings in material as well as because this facilitates the assembly of the chain and detachment of damaged components.

The useful life of the links 2, 2', 2", 102 and/or similar links which form part of the improved chain can be prolonged by providing the one and/or the other plate of each such link with reinforcing means in the form of outwardly extending protuberances serving to engage the external surface of the tread or the ground. The strips or beads 6a and 6b which are shown in FIGS. 4 and 6 constitute one form of protuberances which can be provided at the outer side of the base plate 5 to reduce the likelihood of skidding or slippage of the respective link with reference to the tire. Protuberances which extend from the outer side of the plate 8 enhance traction and greatly reduce the likelihood of or eliminate skidding on ice, in snow or on muddy or other soft terrain. Moreover, the protuberances on the plate 5 and/or 8 prolong the useful life of the respective link and reduce the likelihood of unpredictable and uncontrolled sidewise movement of the vehicle on a terrain which may but need not slope upwardly and/or downwardly (as considered in the direction of forward or rearward transport) but slopes sideways so that the wheels at one side of the vehicle are disposed at a level below the wheels at the other side of the vehicle. Still further, by providing protuberances on each of the plates 5 and 8, the improved chain or track can be used as a "reversible" tire shielding device which can be inverted when the wear upon the exposed sides of the outer plates has progressed sufficiently to warrant an inversion so that the base plates become the outer plates and their (practically untouched) protuberances come in contact with the ground. This does not mean that such reversible or invertible chains or tracks must employ links whereon the protuberances at the outer sides of the plates 8 match or closely approximate the protuberances at the outer sides of the plates 5, i.e., the configuration and/or distribution and/or dimensioning of protuberances on the plates 5 may but need not be identical with the configuration and/or distribution and/or dimensioning of protuberances on the plates 8 of the improved links.

Figure 22:
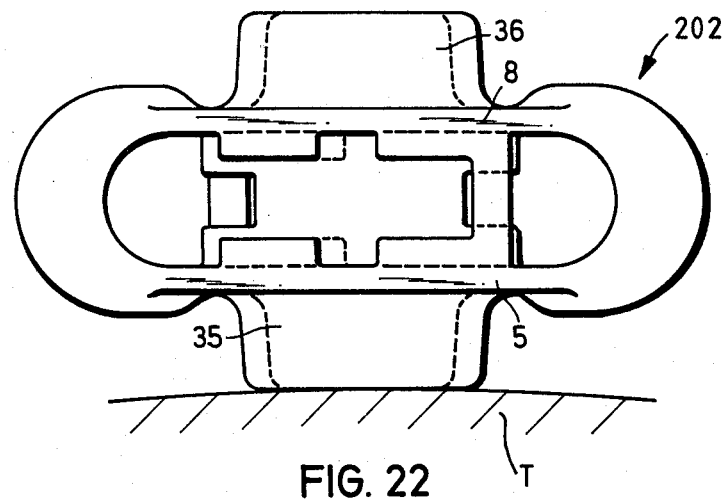
FIG. 22 is a side elevational view of a link whose plates are provided with outwardly extending antiskid protuberances.
Figure 23:
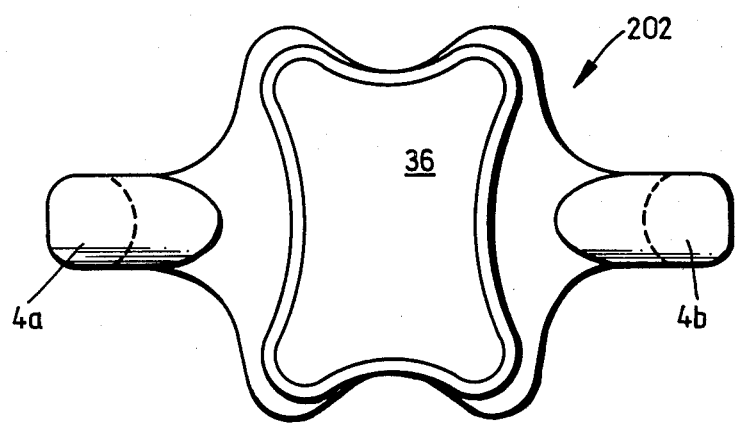
FIG. 23 is a plan view of the link shown in FIG. 22.

FIGS. 22 and 23 illustrate a link 202 wherein the outer side of the base plate 5 is provided with a star-shaped protuberance 35 having four equidistant prongs which contact the exposed surface of the tire T. A similar protuberance 36 is integral with an extends outwardly from the outer plate 8. The remaining parts of the link 202 may be identical with or analogous to those of one of the previously described links, e.g., to the parts of the link 2. As can be seen in FIG. 23, the four prongs of the protuberance 36 need not be very pronounced and their tips may be rounded. Also, the protuberance 36 need not be solid; it can comprise a relatively thin wall having a substantially rectangular outline with the central portions of its sides depressed to provide the four prongs. The configuration of the protuberance 35 may but need not be identical with that of the protuberance 36.

Figure 24:
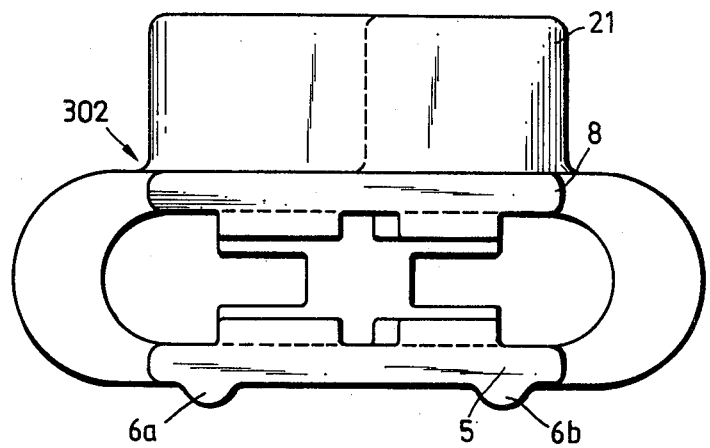
FIG. 24 is a side elevational view of a link whose plates are provided with modified protuberances including strips or beads at the outer side of the base plate and a V-shaped protuberance at the outer side of the other plate.
Figure 25:
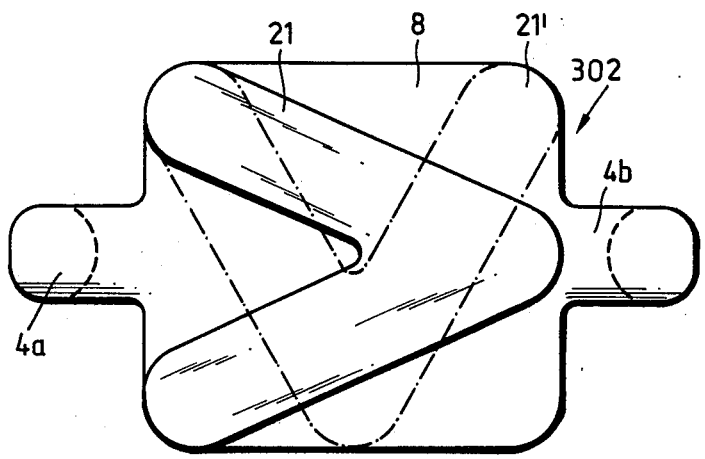
FIG. 25 is a plan view of the link shown in FIG. 24, a different position of the V-shaped protuberance being indicated by phantom lines.

FIGS. 24 and 25 show a further link 302 whose base plate 5 has two protuberances 6a, 6b in the form of beads or strips and whose outer plate 8 has a single protuberance 21 in the form of the letter "V". As shown by solid lines, the protuberance 21 can be oriented in such a way that its legs diverge in a direction from one of the yokes 4a, 4b toward the other yoke. Alternatively, and as shown in FIG. 25 by phantom lines, a protuberance 21' of the outer plate 8 can be oriented at right angles to the protuberance 21 so that its central symmetry plane is normal to the common symmetry plane of the yokes 4a and 4b. Alternatively, the protuberance 21 can be provided on the plate 8 and the protuberance 21' can be provided on the plate 5 (e.g., in lieu of the protuberances 6a, 6b) or vice versa. Still further, the beads 6a, 6b (or at least one bead) can be provided on the plate 8 and the plate 5 can be provided with one or more beads, with the protuberance 21, with the protuberance 21', or with any one of other suitable protuberances which will perform the desired function of preventing skidding of the link 302 with reference to the tire and/or skidding of the link with reference to the ground.

Figure 26:
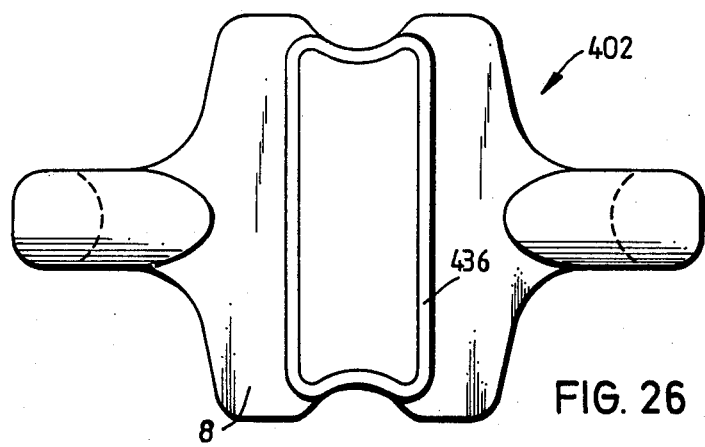
FIG. 26 is a plan view of a link whose outer plate is provided with a substantially rectangular hollow protuberance.

FIG. 26 shows a link 402 which is somewhat similar to the link 202 of FIGS. 22 and 23 except that the outline of its single protuberance 436 comes nearer to a truly rectangular outline. The illustrated protuberance 436 is provided on the outer plate 8; however, a similar or a differently configured and/or dimensioned and/or oriented protuberance can be provided also on the base plate, or the link 402 can have a single protuberance on the base plate.

Figure 27:
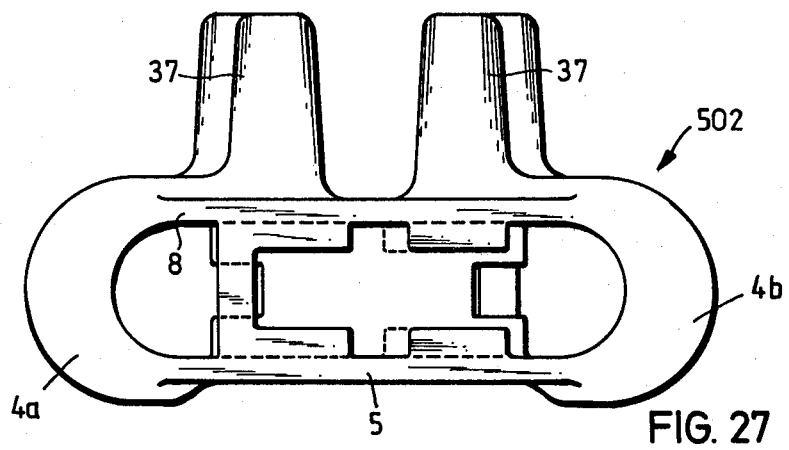
FIG. 27 is a side elevational view of a link whose outer plate is provided with a pair of substantially rectangular protuberances.
Figure 28:
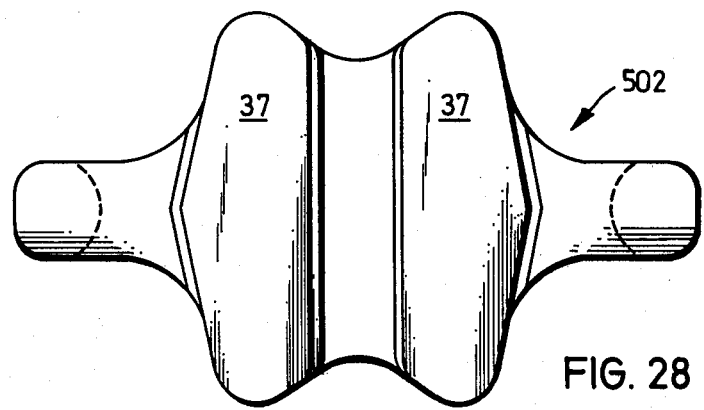
FIG. 28 is a plan view of the structure which is shown in FIG. 27.

Referring now to FIGS. 27 and 28, there is shown a link 502 whose outer plate 8 is provided with two outwardly extending mirror symmetrical protuberances 37 defining between themselves a relatively wide clearance which extends at right angles to the common plane of the yokes 4a and 4b. Each of the protuberances 37 has a substantially rectangular outline. Similar protuberances can be provided at the outer side of the plate 5, and the clearance between such additional protuberances may but need not extend at right angles to the common plane of the yokes 4a and 4b. If each of the plates 5 and 8 is provided with outwardly extending protuberances, the height of the one or both protuberances or sets of protuberances is preferably reduced so as to avoid an excessive overall increase in the height of the link, as considered at right angles to the planes of the plates 5 and 8.

Figure 29:
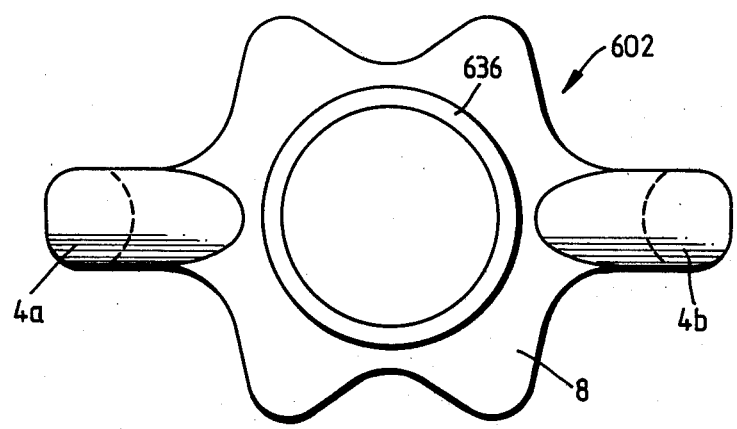
FIG. 29 is a plan view of a link whose outer plate has a hollow cylindrical protuberance.

FIG. 29 shows a link 602 with an outer plate 8 having an annular portuberance 636 which resembles a hollow cylinder and is located midway between the yokes 4a and 4b. The outer diameter of the protuberance 636 can be increased so as to be in immediate or close proximity to the sides of the link 602. A similar protuberance can be provided on the base plate (not shown) of the link 602. Still further, the base plate 5 and/or the plate 8 of the link 602 can be provided with a set of concentric or substantially concentric tubular protuberances, depending on the desired antiskid properties of the chain or track.

Figure 30:
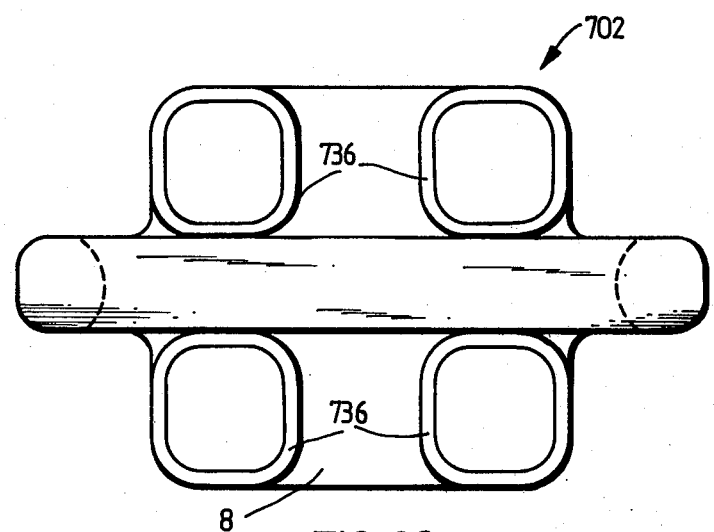
FIG. 30 is a plan view of a link whose outer plate has four square protuberances at the four corners of the link.

FIG. 30 shows a link 702 wherein the outer side of the plate 8 has four substantially square protuberances 736, each at a different corner of the link. The other plate (not shown) of the link 702 can also carry one or more protuberances, e.g., four protuberances which are mirror images of the protuberances 736.

Figure 31:
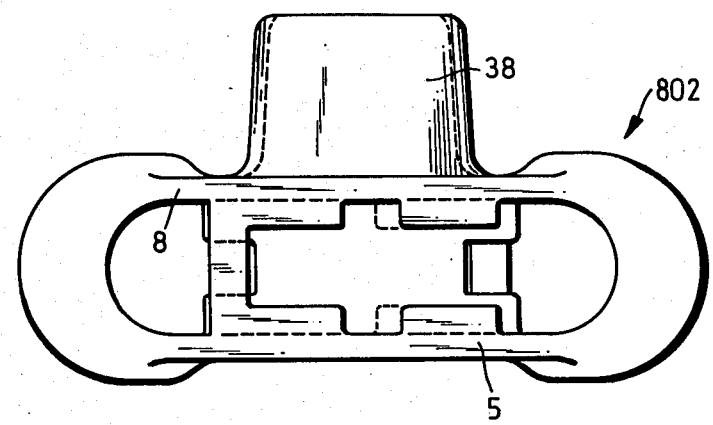
FIG. 31 is a side elevational view of a link whose outer plate includes a single protuberance having a substantially square outline.
Figure 32:
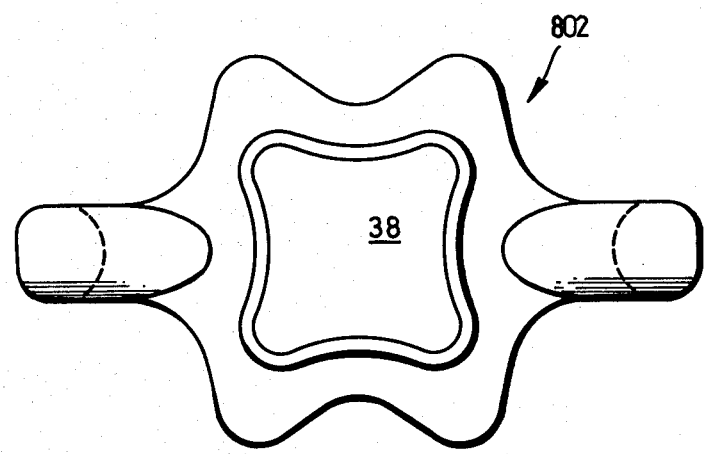
FIG. 32 is a plan view of the structure shown in FIG. 31.

A presently preferred form of a link (802) is shown in FIGS. 31 and 32. This link resembles, in some respects, the link 202 of FIGS. 22-23 and the link 402 of FIG. 26. The protuberance 38 of the outer plate 8 forming part of the link 802 closely resembles a square with only slightly detectable prongs at the four corners. The tips of the prongs are rounded and the protuberance 38 is preferably hollow. It has been found that the traction of a vehicle is particularly satisfactory if the links of the chains or treads carry outwardly extending protuberances of the type shown in FIGS. 31 and 32. The base plate 5 of the link 802 can be provided with an outwardly extending protuberance (not shown) which resembles the protuberance 38, or with one or more protuberances resembling one or more of the previously described protuberances. If the plate 5 also carries one or more protuberances, the height of the illustrated protuberance 38 can (but need not necessarily) be reduced so as to avoid a very pronounced increase in the height of the link. The height or thickness of a link (inclusive of its protuberance or protuberances) can equal half the length of one side of the plate 5 or 8.

Figure 33:
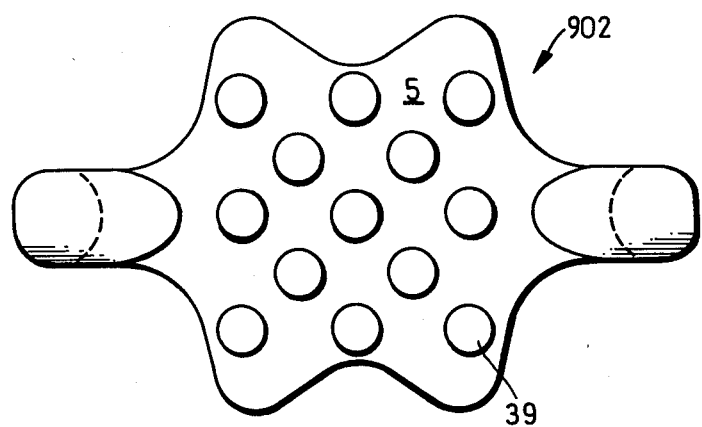
FIG. 33 is a bottom plan view of a link whose base plate has an array of elastic protuberances.
Figure 34:
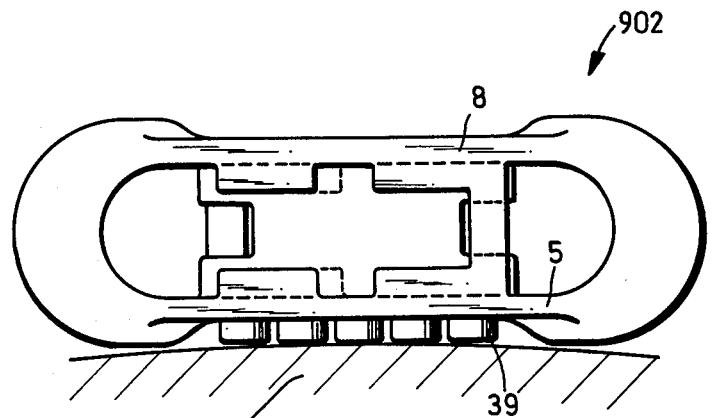
FIG. 34 is a side elevational view of the link which is illustrated in FIG. 33.

FIGS. 33 and 34 illustrate a further link 902 which is designed with a view to at least substantially eliminate the likelihood of skidding of its base plate 5 relative to the outer side of the tire T. To this end, the outer side of the base plate 5 is provided with a set or group of thirteen suitably arrayed protuberances in the form of elastic pads 39 made of rubber or a similar elastic material. The pads 39 can be vulcanized or otherwise fixedly secured to the outer side of the plate 5. Friction between the top lands of the elastic pads 39 and the outer side of the tire T is sufficiently pronounced to prevent any, even slight, slippage of the link 902 with reference to the tread, especially if the chain employing the link 902 is sufficiently tensioned to ensure that the pads 39 bear against the adjacent portions of the outer side of the tire T. Similar elastic pads can be provided at the outer side of the plate 8. Furthermore, the illustrated pads 39 can be arrayed in a number of different ways and their number can be reduced below or increased above thirteen.

Still further, the illustrated cylindrical pads 39 can be replaced with strips or with combinations of strips and cylindrical pads. Also, the pads need not always be made of an elastomeric material; for example, the plate 5 of the link 902 can carry elastic pads in combination with highly wear-resistant pads made of a partly or completely rigid synthetic plastic material, of a metallic material, or a combination of such materials. All that counts is to ensure that, if the pads 39 or their equivalents are provided at the outer side of the base plate 5, the friction coefficient of their material is such that the likelihood of slippage of the link 902 with reference to the tire T is minimal or nil.

The heretofore described protuberances are rigid and preferably integral with the respective plates. This renders it possible to mass-produce the respective links in the form of forgings which have integral protuberances at the outer sides of the plates 5 and/or 8 or to which the protuberances (such as the pads 39) are bonded by vulcanizing or in another suitable way. An advantage of links wherein the plate 5 and/or 8 is integral with one or more protuberances is that the protuberances are much less likely to become separated from the respective plates, even when the vehicle employing the improved chain or track is used on extremely difficult terrain, e.g., on rocky ground where the protuberances strike against fragments of rock, gravel or the like and are subjected to highly pronounced stresses tending to detach or break them away from the respective plates.

However, it is equally within the purview of the invention to provide the plates 5 and/or 8 of links with detachable or separable protuberances. Such feature renders it possible to reconstitute or "repair" a chain by equipping its links with external and/or internal protuberances after a shorter or longer period of use and/or when a vehicle which was used on a muddy terrain is to be converted for use on icy, snowy or other types of ground where the reduction or elimination of skidding of the wheels is of utmost importance. Still further, and as already explained hereinbefore, it is possible to replace certain damaged links and/or shackles with fresh links or shackles to thus restore an otherwise useless chain or track for further use on the tires of heavy-duty vehicles or the like. The repair work is analogous to the assembly of links with shackles, i.e., the damaged or worn parts are removed by reversing the procedure which is being resorted to for assembly, and the fresh parts are then attached to the still usable parts by following the aforediscussed assembling technique.

Figure 35:
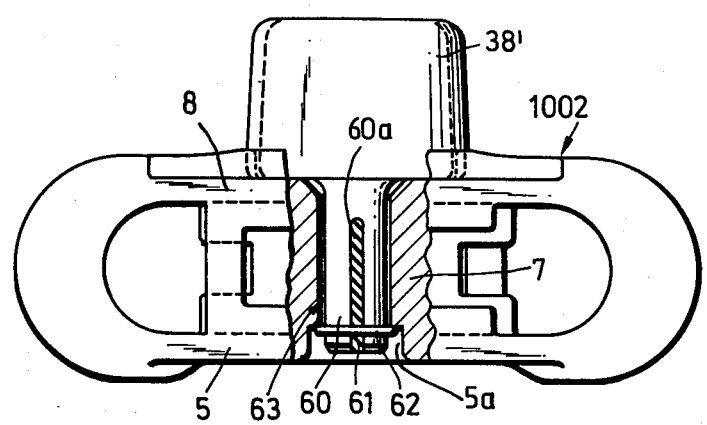
FIG. 35 is a partly side elevational and partly vertical sectional view of a link with a detachable protuberance extending beyond the outer plate.
Figure 36:
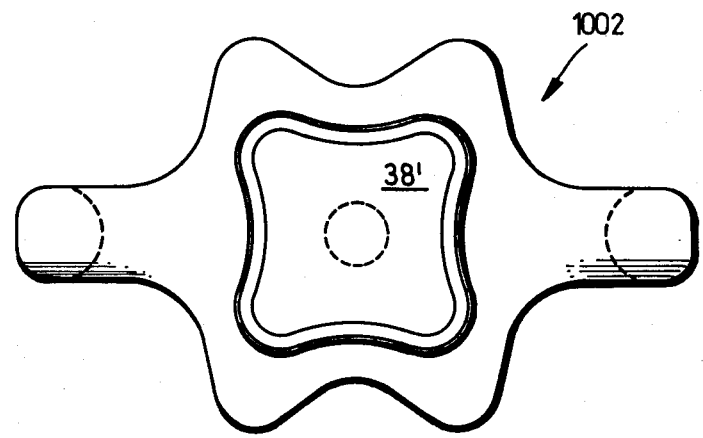
FIG. 36 is a plan view of the link which is shown in FIG. 35.

One type of a link (1002) with a detachable (and hence replaceable) protuberance (38') is shown in FIGS. 35 and 36. The utilization of such links in a chain which embodies the present invention can multiply the length of useful life of the chain and/or its constituents because the damaged or worn protuberances 38' can be replaced with fresh protuberances whenever the need for replacement arises. Thus, the feature of using links with replaceable protuberances enables the owner of the chain, the manufacturer or a repair shop to restore a damaged or used chain so that, for all practical purposes, the restored chain is the equivalent of a new chain. As a rule, it suffices to provide replaceable protuberances for the outer plates 8 of the links because such protuberances come in contact with the ground and are thus subject to wear which is incomparably more pronounced than the wear upon the protuberances which are provided on the base plate 5 and serve to engage the outer side of the tire.

The protuberance 38' of FIGS. 35 and 36 is similar to the protuberance 38 of FIGS. 31 and 32. It comprises a stub 60 which is received in a central bore 63 of the plate 8 and post 7. The stub 60 is preferably integral with the protuberance 38' and is slotted diametrically in at least one plane including its axis so that the lower end portion of the stub can expand or contract. The illustrated diametrically extending slot 60a of the stub 60 receives a filler or insert 61 of elastomeric material which tends to increase the diameter of the lower end portion of the stub 60. A split ring 62 is received in a circumferential groove of the stub 60 at a level below the bottom surface in a recess 5a at the outer side of the base plate 5 to releasably secure the protuberance 38' to the plate 8. The filler 61 can consist of rubber or a synthetic plastic material which exhibits the desired elastomeric properties.

It is clear that the split ring 62 can be replaced with other suitable means for releasably securing the stub 60 in the bore 63. Also, the configuration of the detachable protuberance can deviate from that which is shown in FIGS. 35 and 36.

Figure 37:
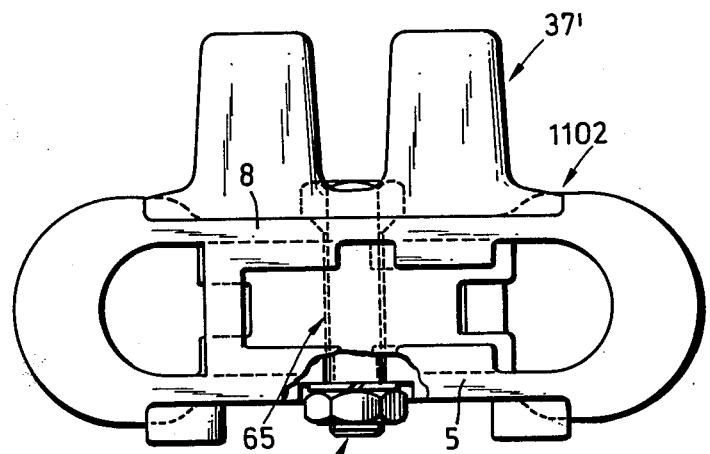
FIG. 37 is a side elevational view of a link which is separably secured to a modified protuberance by a bolt and nut, a portion of the base plate being broken away.
Figure 38:
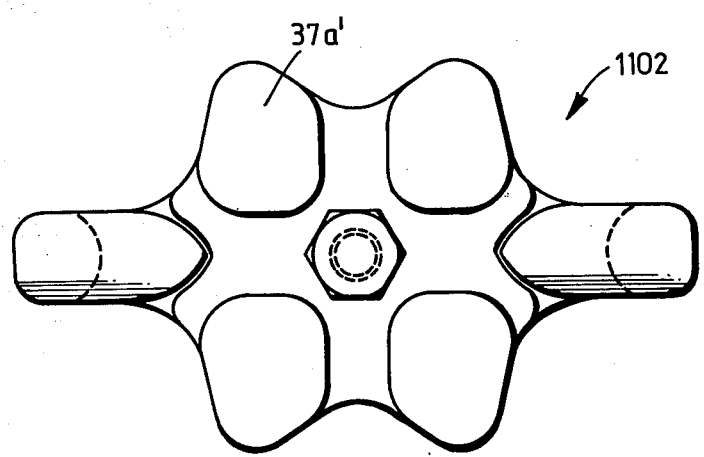
FIG. 38 is a plan view of the structure which is shown in FIG. 37.

FIGS. 37 and 38 show a modified detachable protuberance 37' which is separably secured to a link 1102. The outer side of the plate 8 has a shallow recess for a portion of the protuberance 37' and the latter has a centrally located bore in register with a centrally located bore 65 of the plates 5, 8 and post of the link 1102. The means 66 for separably securing the protuberance 37' to the link 1102 comprises a bolt whose head engages the upper side of the central portion of the protuberance 37' and whose shank meshes with a nut at the underside of the base plate 5. The protuberance 37' has four outwardly extending pins 37a' which surround the head of the aforementioned bolt. The illustrated nut of the securing means 66 can be held against unintentional rotation by an undulate washer (shown in FIG. 37) or by a lock nut, not shown.

The protuberances which are shown in FIGS. 22 to 38, the protuberances 6a, 6b and analogous protuberances on the plates 5 and/or 8 of the improved links not only reduce the likelihood of skidding of the chain with reference to the tire and/or with reference to the ground, but they also prolong the useful life of the chain. The heretofore described and shown protuberances constitute but a few of those which can be provided on the base plate and/or outer plate of a link which forms part of the improved chain. For example, the size of the V-shaped projection 21 or 21' shown in FIGS. 24 and 25 can be greatly reduced so that the plate 8 and/or 5 can carry two or more V-shaped protuberances in requisite distribution to enhance the antiskid properties of the link 302 and/or to further reduce the likelihood of unpredictable wear. If one or both plates of a link are provided with star-shaped protuberances (such as the protuberances 35 and 36 of the link 202 shown in FIGS. 22 and 23), and if each such protuberance comprises four prongs, the orientation of the protuberances is preferably such that two prongs extend circumferentially and two prongs extend transversely of the tread of the tire. This ensures highly satisfactory engagement with the ground if the star-shaped protuberances are provided at the outer sides of the plates 8. The provision of such protuberances at the outer sides of the plates 5 reduces the likelihood of skidding of links with reference to the tire. The expression "star-shaped protuberance" is intended to embrace all types of protuberances which clearly resemble stars as well as those which can be said to constitute polygons with more or less concave outer sides.

If the protuberances consist of metallic material, and if they are integral with the respective plates, the protuberances are preferably forgings which are made simultaneously with the respective links. The separable protuberances of FIGS. 35 to 38 can also constitute forgings.

It has been found that the wear upon the protuberances which extend from the outer sides of the plates 8 is much more pronounced than the wear upon the protuberances at the outer sides of the plates 5. It was also determined that the replacement of all links in a chain which embodies the present invention with fresh links can be carried out at 40% of the cost of a new chain. The exact amount of savings depends on the selected types of links. Additional substantial savings can be achieved if the links are provided with detachable protuberances. Thus, if the detachable protuberances at the outer sides of the plates 8 wear away to such an extent that they must be replaced with fresh detachable protuberances, the replacement of all detachable protuberances can be carried out at 20% of the cost of a new chain.

Of course, another important advantage of detachable protuberances is that the chain can be rapidly converted for a variety of different uses by the simple expedient of replacing a set of first detachable protuberances with a set of different second protuberances. In other words, replacement of detachable protuberances does not come into consideration only and alone after such protuberances have undergone extensive wear but also when the detached protuberances must be kept for future use, i.e., when they are temporarily replaced with protuberances which are more suited for a particular application of the vehicle.

Detachable protuberances can be mass-produced in a particularly simple and inexpensive way by resorting to a drop forging technique. Such protuberances, preferably made of steel, are especially suited for use on hard rock, e.g., in quarries.

The protuberances can be made of a suitable highly wear-resistant material if the chain is to be used on soft terrain and/or in snow or on icy ground. Of course, the adaptation of protuberances to the specific terrain will involve not only appropriate selection of material for the protuberances but also the orientation, distribution, number and size of such parts. Even the mode of securing detachable protuberances to the respective plates can be selected with a view to be most convenient and most reliable in view of the nature of ground which is engaged by the chain. The securing means which is shown in FIGS. 35 and 36 is very simple and allows for rapid attachment or detachment of a protuberance 38'. All that is necessary is to introduce the stub 60 into the bore 63 and to apply the split rings 62 around that portion of the stub 60 which extends beyond the bottom surface in the recess 5a at the outer side of the base plate 5. Removal of the properly attached or secured protuberance is equally simple, i.e., all that is necessary is to remove the split ring 62 from its groove and to thereupon extract the stub 60 from the bore 63. It has been found that such securing means allows for surprisingly rapid replacement of a large number of detachable protuberances per unit of time.

If the links are provided with detachable or integral protuberances at the outer sides of both plates (e.g., in a manner as shown in FIGS. 22 and 23), it is often desirable to use protuberances of identical thickness, as considered at right angles to the plates 5 and 8. Thus, the height of the protuberance 36 shown in FIG. 22 preferably matches the height of the protuberance 35. This enhances the invertibility or reversibility of the chain because each link 202 can be simply inverted after a certain amount of wear upon the protuberance 36 so that the protuberance 35 then comes into contact with the ground and the partially consumed protuberance 36 engages the tire T. As explained above, the configuration, orientation and/or dimensions of the protuberance 36 may but need not match the configuration, orientation and/or dimensions of protuberance 35. Reversibility of the links can result in pronounced lengthening of the useful life of each link.

Figure 39:
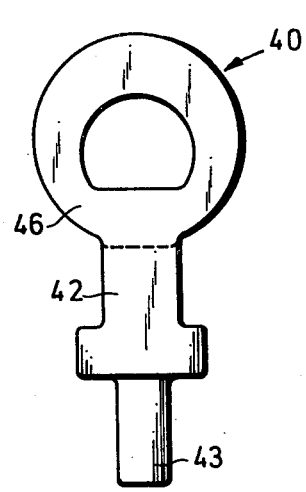
FIG. 39 is an end elevational view of an additional shackle which can be used to secure the links of the improved chain to a tensioning means or to another chain.
Figure 40:
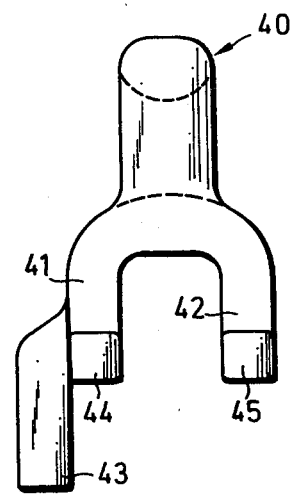
FIG. 40 is a side elevational view of the shackle which is shown in FIG. 39.

As mentioned above, the present invention is concerned primarily with the construction of that part or band of an endless chain or track which is outwardly adjacent to the tread of the tire, especially a tire which is to be used on the wheel of a heavy-duty high-speed earth moving or like vehicle. The means for maintaining the endless band of the improved chain in requisite position and under requisite tension must be constructed and assembled so as to be compatible with the novel part of the chain and, to this end, the chain must be furnished with certain additional components one of which is shown in FIGS. 39 and 40 and constitutes a modified shackle 40 whose purpose, or one purpose of which, has been pointed out in connection with FIG. 15 (note the part 40D in FIG. 15). The shackle 40 of FIGS. 39 and 40 has an eyelet 46 which replaces the webs 14 of the aforediscussed shackles 3, 3', etc. The eyelet 46 is located in a plane making an angle of 90 degrees with the plane of the legs 41 and 42 of the shackle 40. This enables the shackle 40 to couple an intermediate link 51 (such as the link 51D of FIG. 15) with the adjacent marginal link (such as the link 2E of FIG. 15).

The legs 41 and 42 of the shackle 40 are respectively provided with detent members 44 and 45 which respectively correspond to the detent members 17, 17' and 18, 18' of the shackle 3 shown in FIGS. 7 and 8. The spur 43 resembles the spur 19" of the shackle 3" shown in FIGS. 11 and 12. When the legs 41, 42 of the shackle 40 are anchored in the link 2E of FIG. 15, the planes of the plates 5 and 8 of the link 2E are normal to the plane of the eyelet 46. The plane of the eyelet 46 is normal to the plane of the intermediate link 51D.

Figure 41:
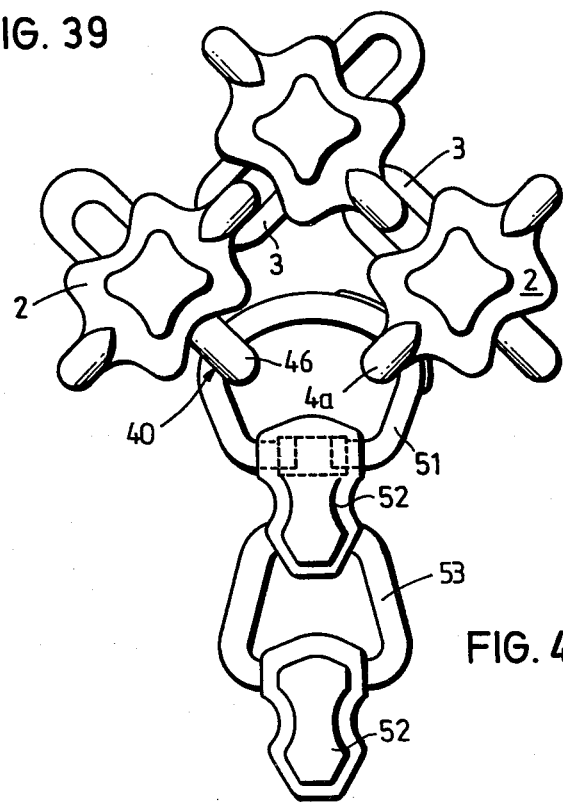
FIG. 41 is an enlarged plan view of a portion of the structure which is shown in FIG. 15.

FIG. 41 illustrates the manner in which an intermediate link or coupling element 51 is articulately connected with two links 2 (corresponding to the links 2D and 2E or FIG. 15), as well as the manner in which the link or coupling element 51 is articulately connected with a shock intercepting or absorbing member or link 52 which, in turn, is articulately connected with a second shock absorbing or intercepting member 53. The latter can be connected to the aforementioned lateral chain by one or more additional shock absorbing members of which only one (52) is actually shown in FIG. 41.

The coupling element 51 is connected with the yoke 4a of the right-hand link 2 of FIG. 41 and with a shackle 40 which is identical with the shackle of FIGS. 39–40 and is anchored in the left-hand link 2 of FIG. 41. The utilization of the shackle 40 having an eyelet in lieu of a web enables the arcuate portion of the coupling element 51 to pass through the bight of the yoke 4a on the right-hand link 2 of FIG. 41 as well as through the opening of the eyelet 46 forming part of the shackle 40. The free ends of the coupling element 51 are provided with suitable self-locking devices which enable the element 51 to properly engage the adjacent portion of the member 52 which is attached to a series of alternating members 52, 53, 52 forming part of the means for securing the band of interconnected links 2 and shackles 3 to the respective lateral chain for the tire whose tread is surrounded by the aforementioned band consisting of parts 2 and 3. Each member 52 can constitute a forging having upper openings for the self-locking parts of the coupling element 51 and openings in the lower part for the adjacent prongs of the member 53. Self-locking features can be provided also between the parts 52 and 53 in the lower portion of FIG. 41. The series of parts including the coupling element 51 and members 52, 53, 52 of FIG. 41 extends radially of the tire and the lowermost member 52 is attached to a tensioning device or to the aforementioned lateral chain for the tire which carries the band of links 2 and shackles 3. The presence or absence of (i.e., the need for) lateral chains will depend on the nature of terrain on which the vehicle is to travel. For example, such lateral chains will be used or are desirable if the wheels of the vehicle penetrate well into a relatively soft ground consisting of or containing gravel, pieces of rock or the like.

What is claimed is:

1. A protecting and antiskid chain for use on the tires of automotive vehicles, especially on the tires of high-speed heavy-duty earth moving and like vehicles, comprising a pair of main links each including a tire-contacting base plate and a ground-contacting outer plate which is spaced apart from, substantially parallel to and defines a compartment with the base plate, each of said plates having a substantially polygonal outline with two sides located substantially opposite each other and the plates of each link being in register with one another, the length of one side of each of said plates exceeding the thickness of the respective link, as considered at right angles to the planes of said plates, each link further including two coplanar yokes rigid with and disposed in a plane which is substantially normal to the respective plates and located outside of the confines of such plates, said yokes extending from said sides of the respective plates and each link also including a plurality of projections provided on at least one of the plates and disposed in the respective compartment, said projections including a first group of several projections at one side and a second group of several projections at the other side of the respective normal plane, said plates further having outer sides and at least one of said links comprising at least one protuberance at the outer side of at least one of the respective plates; and a first shackle articulately connecting said links and including a web interfitted with one yoke of one of said links and two legs having detent members extending into the compartment of the other of said links and engaging with selected projections in such compartment to anchor the legs in the other link, said groups of projections of said other link defining guide channels for the detent members on the legs of the shackle.

2. The chain of claim 1, wherein the legs of said shackle are disposed in a second plane which is at least substantially normal to the plane of the yokes of said other link.

3. The chain of claim 1, wherein said shackle has an axis disposed between said legs thereof and being at least substantially normal to the axis of one yoke of said other link.

4. The chain of claim 1, wherein the yokes of each of said links connect the plates of the respective link to one another.

5. The chain of claim 1, wherein said projections are provided on each plate of each of said links and the projections in each of said compartments define first guide channels adjacent the base plate and second guide channels adjacent the outer plate of the respective link.

6. The chain of claim 1, wherein the projections of each of said links further include a post disposed in the plane of the respective yokes and bounding portions of the channels in the respective compartment.

7. The chain of claim 6, wherein said post has extensions disposed between the first and second groups of the respective projections.

8. The chain of claim 1, wherein each of said links includes a post which extends across the respective compartment and connects the plates of the respective link to one another.

9. The chain of claim 8, wherein said posts are at least substantially normal to the planes of the respective plates and form part of the respective projections.

10. The chain of claim 1, wherein the projections of each first group are mirror symmetrical to the projections of the respective second group with reference to the respective normal plane, each group of projections defining at least one passage communicating with the respective channel, the detent members on the legs of the shackle being insertable into said channels by way of the respective passages.

11. The chain of claim 10, wherein said legs are disposed in a first plane and said detent members are disposed in second planes which are at least substantially normal to said first plane, said detent members being receivable with play in the guide channels of said links.

12. The chain of claim 10, wherein each of said groups comprises a pair of projections on one plate of the respective link.

13. The chain of claim 10, wherein each of said groups comprises a pair of projections on each plate of the respective link.

14. The chain of claim 1, wherein at least some of said projections connect the respective plates to one another and define with the respective plates passages for insertion of detent members into the corresponding compartment, the detent members and the legs of said shackle being disposed in a common plane.

15. The chain of claim 1, wherein at least one leg of said shackle has a spur which is received in the compartment of said other link adjacent to one yoke of said other link, and further comprising a second shackle having a web which is interfitted with the one yoke of said other link to thereby hold said spur against extraction from the respective compartment.

16. The chain of claim 15, wherein said shackles are U-shaped.

17. The chain of claim 15, wherein the projections of said other link and the detent members of said first shackle are configured and dimensioned to prevent extraction of said legs from the compartment of said other link even after extensive wear upon the one yoke of said other link and/or upon the web of said second shackle.

18. The chain of claim 17, wherein said guide channels are parallel to the planes of the respective yokes.

19. The chain of claim 1, further comprising a second shackle having an eyelet receiving a portion of one yoke of one of said links and disposed in a plane which is at least substantially normal to the plates of said last mentioned one link.

20. The chain of claim 19, wherein said links and said first shackle form part of a band-like portion of the chain, said band-like portion having a marginal portion and said last mentioned one link being adjacent to said marginal portion.

21. The chain of claim 1, wherein each of said plates has a substantially square outline with two pairs of substantially parallel sides and the yokes extend from one pair of parallel sides of the respective plates.

22. The chain of claim 21, wherein the yokes of each of said links are disposed substantially midway between the other pair of sides of the respective plates.

23. The chain of claim 1, wherein said yokes have arcuate portions with first radii of curvature and the web of said shackle has an arcuate portion with a larger second radius of curvature so that said web and the one yoke of said one link are in a substantial point contact with one another.

24. The chain of claim 23, wherein said second radius of curvature exceeds said first radii of curvature by approximately 20%.

25. The chain of claim 23, wherein said web has a convex surface engaging the one yoke of said one link and having a radius of curvature exceeding said first radii.

26. The chain of claim 1, wherein said yokes include enlarged web-engaging portions arranged to wear away as a result of engagement with and movement relative to the webs of shackles.

27. The chain of claim 1, wherein the web of said shackle has an enlarged portion arranged to wear away as a result of engagement with and movement relative to the one yoke of said one link.

28. The chain of claim 1, wherein said protuberance has a substantially V-shaped outline.

29. The chain of claim 1, wherein said protuberance has a substantially polygonal outline.

30. The chain of claim 29, wherein said protuberance has a substantially rectangular outline.

31. The chain of claim 1, wherein said protuberance has a substantially cylindrical outline.

32. The chain of claim 1, wherein said protuberance has a substantially star-shaped outline.

33. The chain of claim 32, wherein said protuberance has four prongs.

34. The chain of claim 1, wherein each plate of said one link has a single protuberance.

35. The chain of claim 1, wherein the base plate of said one link has a plurality of protuberances.

36. The chain of claim 35, wherein at least some of said protuberances consist of elastomeric material.

37. The chain of claim 35, wherein at least some of said protuberances consist of a synthetic plastic material.

38. The chain of claim 35, wherein at least some of said protuberances are substantially cylindrical pads.

39. The chain of claim 35, wherein at least one of said protuberances is a strip.

40. The chain of claim 1, wherein said one plate is a forging and said protuberance is an integral part of said one plate.

41. The chain of claim 1, further comprising means for separably securing said protuberance to said one plate.

42. The chain of claim 1, wherein said protuberance is made by drop forging and consists of steel.

43. The chain of claim 1, wherein at least a portion of said protuberance consists of a wear-resistant synthetic plastic material.

44. The chain of claim 1, wherein said one link has a bore and further comprising means for separably securing said protuberance to said one link, said securing means comprising a stub provided on said protuberance and extending into said bore.

45. The chain of claim 44, wherein said stub has at least one slot and further comprising an elastic filler in the slot of said stub.

46. The chain of claim 45, wherein said stub has a portion extending beyond the outer side of one plate of said one link and said securing means further comprises a split ring surrounding said portion of said stub.

47. The chain of claim 1, further comprising threaded fastener means for separably securing said protuberance to said one link.

48. The chain of claim 47, wherein said threaded fastener means extends substantially centrally of and through said protuberance.

49. The chain of claim 47, wherein said protuberance has a plurality of pins.

50. The chain of claim 1, wherein said one link has a protuberance at the outer side of each of its plates and the thickness of said protuberances, as considered at right angles to the respective plates, is at least substantially the same.

51. The chain of claim 50, wherein the configuration of one of said protuberances at least approximates the configuration of the other of said protuberances.

52. The chain of claim 1, wherein said protuberance is provided at the outer side of the base plate of said one link and includes at least one elongated bead.

53. The chain of claim 1, wherein each of said plates has a substantially square outline, the length of one side of each of said plates being approximately twice the thickness of the respective link.

54. The chain of claim 1, wherein each of said plates has a substantially square outline and the length of each side of each of said plates at least approximates 80 millimeters, each of said yokes having an arcuate portion with an inner radius of curvature of between approximately 12 and 13 millimeters and said web having a substantially circular cross-sectional outline with a radius of approximately 10 millimeters, said arcuate portion of each of said yokes having a substantially circular cross-sectional outline with a radius which at least approximates 10 millimeters.

55. The chain of claim 1, wherein said guide channels extend in substantial parallelism with the plane of the yokes forming part of the respective link, said projections being provided on and being spaced apart from the sides of at least one plate of each of said links, the distance between said projections and the sides of the respective plates being approximately 9 millimeters, the width of said projections, as considered at right angles to the respective normal plane being approximately 10 millimeters, the width of said detent members as considered at right angles to the plane of the yokes of said other link being approximately 10 millimeters, and the width of said channels being approximately 12 millimeters.

56. The chain of claim 1, wherein the yokes of said one link and the web of said shackle define a pivot axis which is located in the plane of the yokes of said one link and about which said shackle is pivotable through angles of at least 30° to the opposite sides of a predetermined neutral position.

57. The chain of claim 56, wherein each of said angles is approximately 45°.

58. The chain of claim 1, wherein the yokes of said one link and the web of said shackle define a pivot axis which is at least substantially normal to the plane of the yokes of said one link and about which said shackle is pivotable through angles of at least 20° to each side of a predetermined neutral position in which the base plates of said links are disposed in a common plane.

59. The chain of claim 58, wherein each of said angles is approximately 30°.

60. The chain of claim 1, further comprising at least one additional link and additional shackles for coupling said additional link with said pair of links.

61. The chain of claim 1, wherein said links form part of a pattern including groups of four, six or eight interconnected links each.

62. The chain of claim 1, wherein said links form part of a pattern including groups of three and six links each.

63. The chain of claim 1, wherein said links form part of a pattern including groups of four and eight links each.

64. The chain of claim 1, including an endless band-like portion consisting exclusively of main links and shackles and having two substantially parallel marginal portions.

* * * * *